US012807179B2

(12) United States Patent
Hetang

(10) Patent No.: US 12,807,179 B2
(45) Date of Patent: Nov. 24, 2026

(54) AUTONOMOUS PATH GENERATION WITH PATH OPTIMIZATION

(71) Applicant: Waymo LLC, Mountain View, CA (US)

(72) Inventor: Congrui Hetang, Mountain View, CA (US)

(73) Assignee: Waymo LLC

( * ) Notice: Subject to any disclaimer, the term of this patent is extended or adjusted under 35 U.S.C. 154(b) by 704 days.

(21) Appl. No.: 17/349,450

(22) Filed: Jun. 16, 2021

(65) Prior Publication Data

US 2022/0402521 A1 Dec. 22, 2022

(51) Int. Cl.
*B60W 60/00* (2020.01)
*B60W 40/04* (2006.01)
(Continued)

(52) U.S. Cl.
CPC ........ *B60W 60/0011* (2020.02); *B60W 40/04* (2013.01); *B60W 40/06* (2013.01); (Continued)

(58) Field of Classification Search
CPC .... B60W 60/011; B60W 40/04; B60W 40/06; B60W 2554/4041; B60W 2552/00; B60W 2552/53; B60W 2554/00; G06N 20/00; G06F 18/219; G06F 18/214; G05D 1/0061; G05D 1/0088; G05D 1/021; G05D 1/0214; G05D 1/0221; G05D 1/0223; B60K 28/00; B60K 28/165; B60K 28/12; B60K 28/14;
(Continued)

(56) References Cited

U.S. PATENT DOCUMENTS

| | | | | |
|---|---|---|---|---|
| 10,379,538 | B1 * | 8/2019 | Sheckells | G05D 1/0217 |
| 10,671,075 | B1 * | 6/2020 | Kobilarov | G05D 1/0088 |

(Continued)

FOREIGN PATENT DOCUMENTS

| | | | |
|---|---|---|---|
| EP | 3723001 A1 | 10/2020 | |
| WO | 2021016116 A1 | 1/2021 | |

OTHER PUBLICATIONS

J.A. Cobano et al., Path planning based on Genetic Algorithm and the Monte-Carlo method to avoid aerial vehicle collision under uncertainties, 2011 IEEE, pp. 4429-4434.*

(Continued)

*Primary Examiner* — Manglesh M Patel
(74) *Attorney, Agent, or Firm* — Van Hoven PC; Jordan Becker

(57) ABSTRACT

A system includes a memory device, and a processing device, operatively coupled to the memory device, to receive a set of input data including a roadgraph. The roadgraph includes an autonomous vehicle driving path. The processing device is further to determine that the autonomous vehicle driving path is affected by one or more obstacles, identify a set of candidate paths that avoid the one or more obstacles, each candidate path of the set of candidate paths being associated with a cost value, select, from the set of candidate paths, a candidate path with an optimal cost value to obtain a selected candidate path, generate a synthetic scene based on the selected candidate path, and train a machine learning model to navigate an autonomous vehicle based on the synthetic scene.

22 Claims, 11 Drawing Sheets

(51) Int. Cl.
*B60W 40/06* (2012.01)
*G06F 18/214* (2023.01)
*G06N 20/00* (2019.01)

(52) U.S. Cl.
CPC ........... *G06F 18/214* (2023.01); *G06N 20/00* (2019.01); *B60W 2552/00* (2020.02); *B60W 2554/4041* (2020.02)

(58) Field of Classification Search
CPC ...... B60K 28/16; B60K 28/066; B60K 28/08; B60K 28/10; B60K 28/04; B60K 28/06; B60K 28/063; B60K 2028/003; B60K 2028/006; B60K 28/02
USPC .......................................... 701/23, 25, 26, 27
See application file for complete search history.

(56) References Cited

U.S. PATENT DOCUMENTS

| | | | | |
|---|---|---|---|---|
| 10,933,869 | B2 * | 3/2021 | Gochev | G08G 1/163 |
| 11,003,183 | B2 | 5/2021 | Zhu | |
| 11,034,364 | B1 * | 6/2021 | Narang | G06N 20/00 |
| 11,560,154 | B1 * | 1/2023 | Gate | G01C 21/3614 |
| 11,731,612 | B2 * | 8/2023 | Zhou | G05D 1/0221 701/23 |
| 11,891,087 | B2 * | 2/2024 | Marchetti-Bowick | G06N 3/08 |
| 11,891,088 | B1 | 2/2024 | Kobilarov et al. | |
| 11,922,642 | B1 | 3/2024 | Setzer et al. | |
| 12,013,256 | B1 * | 6/2024 | Kaplan | G01C 21/3848 |
| 12,103,554 | B2 * | 10/2024 | Urtasun | G06F 30/15 |
| 12,459,539 | B1 | 11/2025 | Nag et al. | |
| 2015/0353082 | A1 * | 12/2015 | Lee | B60W 10/20 701/41 |
| 2015/0353085 | A1 * | 12/2015 | Lee | B60W 30/10 701/533 |
| 2016/0375901 | A1 * | 12/2016 | Di Cairano | B60W 30/09 701/26 |
| 2017/0202131 | A1 * | 7/2017 | Bunderson | B60W 10/04 |
| 2017/0357262 | A1 * | 12/2017 | Dix | G05D 1/0231 |
| 2018/0011494 | A1 | 1/2018 | Zhu et al. | |
| 2018/0162412 | A1 * | 6/2018 | Gao | B60W 30/143 |
| 2018/0188043 | A1 * | 7/2018 | Chen | G06T 7/593 |
| 2018/0203445 | A1 * | 7/2018 | Micks | G06F 30/15 |
| 2018/0284769 | A1 * | 10/2018 | Wang | G05D 1/0248 |
| 2019/0079514 | A1 | 3/2019 | Zhu | |
| 2019/0079523 | A1 * | 3/2019 | Zhu | G05D 1/0274 |
| 2019/0079528 | A1 * | 3/2019 | Zhu | B60W 30/10 |
| 2019/0080266 | A1 * | 3/2019 | Zhu | G05D 1/0223 |
| 2019/0086925 | A1 * | 3/2019 | Fan | G05D 1/0088 |
| 2019/0086930 | A1 * | 3/2019 | Fan | G05D 1/0088 |
| 2019/0086932 | A1 * | 3/2019 | Fan | G06V 20/588 |
| 2019/0113927 | A1 * | 4/2019 | Englard | G06N 5/046 |
| 2019/0146500 | A1 * | 5/2019 | Yalla | G06F 16/29 701/25 |
| 2019/0147255 | A1 * | 5/2019 | Homayounfar | G06N 3/09 701/23 |
| 2019/0228571 | A1 | 7/2019 | Atsmon | |
| 2019/0235506 | A1 * | 8/2019 | Bardapurkar | G01C 21/005 |
| 2019/0303759 | A1 * | 10/2019 | Farabet | G06N 3/045 |
| 2019/0310644 | A1 * | 10/2019 | Zhang | G01C 21/3453 |
| 2019/0315357 | A1 * | 10/2019 | Zhang | G05D 1/0238 |
| 2019/0361432 | A1 * | 11/2019 | Levinson | H04L 67/10 |
| 2019/0384304 | A1 | 12/2019 | Towal | |
| 2020/0074266 | A1 * | 3/2020 | Peake | G06V 10/764 |
| 2020/0191586 | A1 * | 6/2020 | Luo | G01C 21/3453 |
| 2020/0191979 | A1 * | 6/2020 | Lindskog | G01S 5/0226 |
| 2020/0192389 | A1 | 6/2020 | ReMine | |
| 2020/0209864 | A1 * | 7/2020 | Chen | G01C 21/3811 |
| 2020/0211370 | A1 * | 7/2020 | Chen | G08G 1/0129 |
| 2020/0218261 | A1 * | 7/2020 | Zidek | G05D 1/0088 |
| 2020/0301733 | A1 | 9/2020 | Zhang et al. | |
| 2020/0301799 | A1 | 9/2020 | Manivasagam | |
| 2020/0310446 | A1 * | 10/2020 | Zhu | G05D 1/0217 |
| 2020/0341466 | A1 * | 10/2020 | Pham | G06V 20/56 |
| 2020/0356828 | A1 | 11/2020 | Palanisamy et al. | |
| 2021/0004017 | A1 * | 1/2021 | Colgate | G01C 21/30 |
| 2021/0020045 | A1 * | 1/2021 | Huang | G05D 1/021 |
| 2021/0061307 | A1 | 3/2021 | Connell et al. | |
| 2021/0080955 | A1 * | 3/2021 | Wilkinson | B60W 60/0011 |
| 2021/0181740 | A1 * | 6/2021 | Zhu | B60W 30/18027 |
| 2021/0241614 | A1 * | 8/2021 | Mubarek | G08G 1/096827 |
| 2021/0309248 | A1 * | 10/2021 | Choe | G06N 3/04 |
| 2021/0325891 | A1 * | 10/2021 | Young | G01C 21/3446 |
| 2021/0347382 | A1 * | 11/2021 | Huang | G05D 1/0212 |
| 2021/0370980 | A1 * | 12/2021 | Ramamoorthy | G06F 18/214 |
| 2021/0373566 | A1 * | 12/2021 | Agarwal | B60W 30/18145 |
| 2022/0157161 | A1 | 5/2022 | Tan et al. | |
| 2022/0219730 | A1 * | 7/2022 | Song | B60W 60/0023 |
| 2022/0261519 | A1 | 8/2022 | Muehlenstaedt et al. | |
| 2022/0332336 | A1 | 10/2022 | Weaver et al. | |
| 2022/0349725 | A1 * | 11/2022 | Chreptyk | G01C 21/32 |
| 2022/0391766 | A1 * | 12/2022 | Acuna Marrero | G06N 20/00 |
| 2023/0021034 | A1 * | 1/2023 | Cui | G06N 3/0475 |
| 2023/0027496 | A1 | 1/2023 | Rajakumar et al. | |
| 2023/0038842 | A1 * | 2/2023 | Yu | G06N 20/20 |
| 2023/0252624 | A1 | 8/2023 | Sergeev | |
| 2023/0415772 | A1 | 12/2023 | Wolff et al. | |
| 2024/0001957 | A1 * | 1/2024 | Choe | G06V 20/58 |
| 2024/0001963 | A1 * | 1/2024 | Kinakar | B60W 30/18163 |
| 2024/0017747 | A1 | 1/2024 | Hasenklever et al. | |
| 2024/0061307 | A1 * | 2/2024 | Yafuso | G02F 1/213 |
| 2024/0092357 | A1 * | 3/2024 | Kobilarov | B60W 30/0956 |
| 2024/0288274 | A1 | 8/2024 | Zhou et al. | |
| 2024/0290143 | A1 | 8/2024 | Famiglietti et al. | |
| 2024/0391495 | A1 * | 11/2024 | Nister | B60W 50/00 |

OTHER PUBLICATIONS

Tristan Cazenave et al., Monte Carlo Vehicle Routing, 2020 CEUR-WS, vol. 2701, pp. 1-8 (pdf).*

Chenjing Jiao et al., A fast and effective deep learning approach for road extraction from historical maps by automatically generating training data with symbol reconstruction, Aug. 22, 2022, elsevier.com, pp. 1-2 (pdf).*

David Yu, Road Feature Detection & Geo Tagging with Deep Learning, Jun. 6, 2019, Medium.com, pp. 1-50 (pdf).*

Mariusz Bojarski et al., End-to-End Deep Learning for Self-Driving Cars, Aug. 17, 2016, Nvidia corp., pp. 1-9 (pdf).*

Inkyung Sung et al., On the training of a neural network for online path planning with offline path planning algorithms, Jun. 2020, Elsevier.com, pp. 1-9.*

Maya Kabkab et al., DCNNs on a Diet: Sampling Strategies for Reducing the Training Set Size, Jun. 14, 2016, arxiv, pp. 1-14 (pdf).*

Noah Goodman, Uber AI Labs Open Sources Pyro, a Depp Probabilistic Programming Language, Nov. 3, 2017, Uber Blog, pp. 1-10 (pdf).*

Florent Altche et al., Partitioning of the Free Space-Time for On-Road Navigation of Autonomous Ground Vehicles, Dec. 2017, IEEE, pp. 2126-2133.*

The extended European search report for EP Application No. 22179405.0, mailed Nov. 22, 2022, 8 pages.

The extended European search report for EP Application No. 22179410.0, mailed Nov. 23, 2022, 8 pages.

Nividia: "Nividia Drive Sim", Youtube, Jan. 8, 2019 (Jan. 8, 2019), p. 1 pp., XP054981495, Retrieved from the Internet: URL:https://www.youtube.com/watch?v=DXsLDyiONV4, [retrieved on Mar. 8, 2021].

Ivan S., et al., "Traffic Scene Classification on a Representation Budget," IEEE Transactions on Intelligent Transportation Systems, Jan. 2020, vol. 21(1), pp. 1-10.

* cited by examiner

AUTONOMOUS PATH GENERATION WITH PATH OPTIMIZATION

TECHNICAL FIELD

The instant specification generally relates to autonomous vehicles. More specifically, the instant specification relates to implementing autonomous path generation with path optimization.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

SUMMARY

In one implementation, disclosed is a system including a memory device and a processing device coupled to the memory device. The processing device is to receive a set of input data including a roadgraph. The roadgraph includes an autonomous vehicle driving path. The processing device is further to determine that the autonomous vehicle driving path is affected by one or more obstacles, identify a set of candidate paths that avoid the one or more obstacles, each candidate path of the set of candidate paths being associated with a cost value, select, from the set of candidate paths, a candidate path with an optimal cost value to obtain a selected candidate path, generate a synthetic scene based on the selected candidate path, and train a machine learning model to navigate an autonomous vehicle based on the synthetic scene.

In another implementation, disclosed is a method including receiving, by a processing device, a first set of input data including a roadgraph. The roadgraph includes an autonomous vehicle driving path. The method further includes determining, by the processing device, that the autonomous vehicle driving path is affected by one or more obstacles, identifying, by the processing device, a set of candidate paths that avoid the one or more obstacles, each candidate path of the set of candidate paths being associated with a cost value, selecting, by the processing device from the set of candidate paths, a candidate path with an optimal cost value to obtain a selected candidate path, generating, by the processing device, a synthetic scene based on the selected candidate path, and training, by the processing device, a machine learning model to navigate an autonomous vehicle based on the synthetic scene.

In yet another implementation, disclosed is a non-transitory computer-readable storage medium having instructions stored thereon that, when executed by a processing device, cause the processing device to obtain a machine learning model trained using synthetic data used to navigate an autonomous vehicle. The synthetic data includes a synthetic scene generated based on a candidate path having an optimal cost value that avoids one or more obstacles. The non-transitory computer-readable storage medium has further instructions stored thereon that, when executed by the processing device, cause the processing device to identify, using the machine learning model, a set of artifacts within a scene while the autonomous vehicle is proceeding along a driving path, and cause a modification of the driving path in view of the set of artifacts within the scene.

BRIEF DESCRIPTION OF THE DRAWINGS

The disclosure is illustrated by way of examples, and not by way of limitation, and can be more fully understood with references to the following detailed description when considered in connection with the figures, in which.

DETAILED DESCRIPTION

Figure 1:
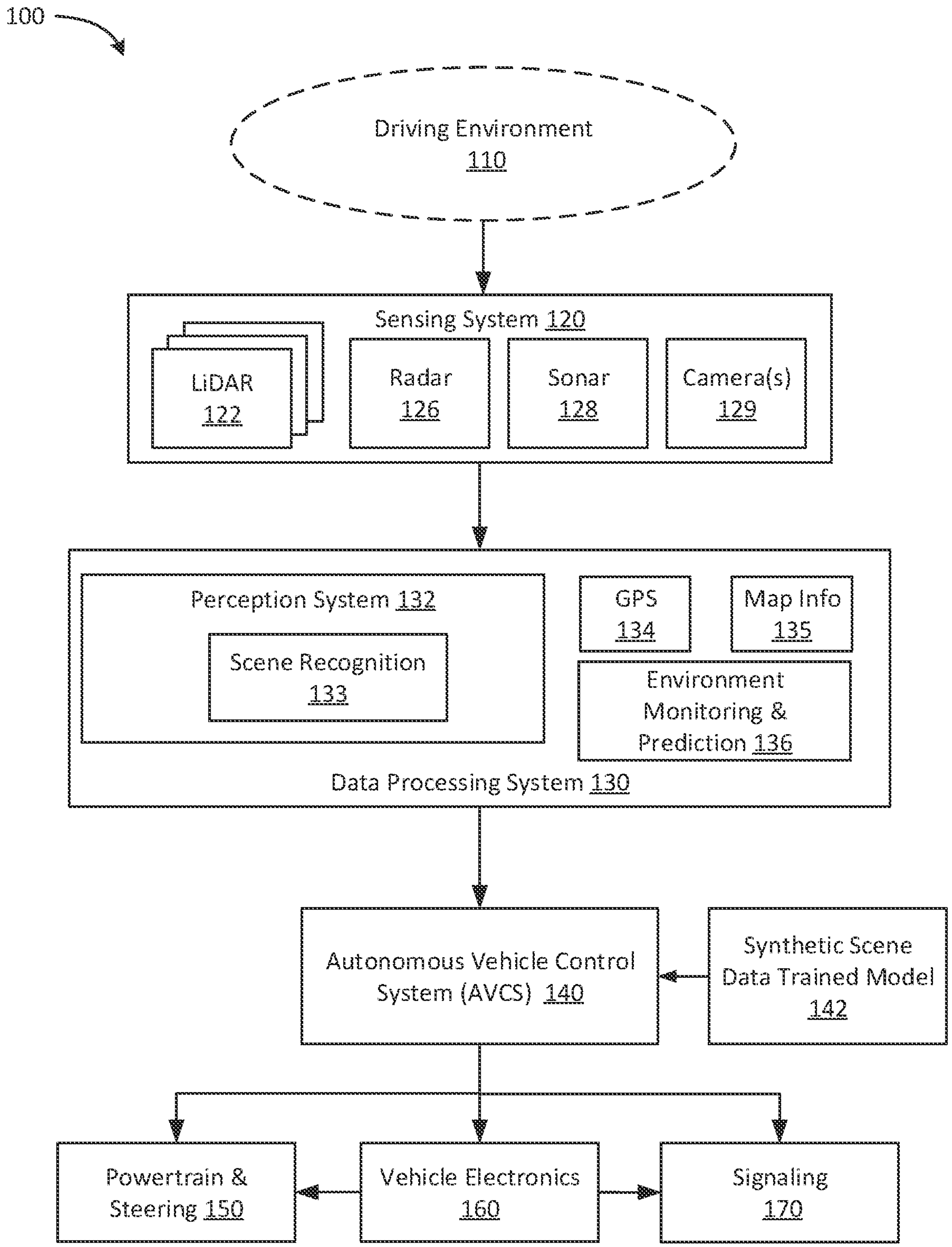
FIG. 1 is a diagram illustrating components of an example autonomous vehicle capable of implementing synthetic construction zones, in accordance with some implementations of the present disclosure.

A vehicle travels a route from a starting location to a destination location. Routes include segments that have different grades (e.g., elevations, pitches, uphill, downhill) of different lengths. Routes also include segments that have different radius of curvature (e.g., winding roads of different lengths and grades). Some route segments are associated with historical data, such as historically windy segments, historically high-traffic segments, historically recommended lanes in segments, etc.

An autonomous vehicle (AV) performs vehicle actions, such as braking, steering, and throttling, to move the AV from the starting location to the destination location along the route. The AV has a planning module that receives route data (e.g., from a server) that includes particular roads to travel from the starting location to the destination location. The planning module (also referred to herein as a "routing module") receives sensor data from the perception system (e.g., vehicle sensors) that indicates locations of other objects. The routing module uses the sensor data and the route data to generate short time horizon routing data. The short time horizon routing data includes instructions of how to control the AV over a short interval of time (e.g., the next 10 seconds). The short time horizon routing data may be generated (e.g., regenerated, refreshed) very frequently (e.g., every 100 milliseconds (ms)). By being generated very frequently, the short time horizon routing data can reflect changes in the vehicle or the world (e.g., engine degradation, other objects changing course or speed or appearing suddenly). The routing module provides the short time horizon routing data to the motion control module. The motion control module controls the vehicle systems over the next interval of time (e.g., the next 10 seconds, next 100 ms) based on the short time horizon plan data (e.g., and the refreshed or regenerated short time horizon plan). The routing module continues generating (e.g., refreshing) new short time horizon routing data for the subsequent intervals of time based on the route data and the current sensor data from the perception system. The motion control module continues controlling the vehicle based on the new short time horizon plan data.

Construction zones are one type of scene that AV's presently struggle to address. Machine learning models for construction zone understanding with respect to AV's can require a large amount of construction zone data with ground-truth labels of how to navigate inside of construction zones. Conventionally, construction zone data is collected from real-world scenarios ("real construction zone data") and some real construction zone data can be labeled by humans for pair-wise construction cone connectivity. Although such real construction zone data can have high fidelity, it can also suffer from limited data scale and diversity. The natural scarcity of real construction zone data relative to overall distance driven limits the amount of real-world data available, regardless of distance driven. Additionally, the manual labeling of construction zones can be non-trivial and/or expensive. Accordingly, it is difficult to effectively train machine learning models for AV construction zone understanding using real-world construction zone data.

Aspects of the disclosure address the above challenges along with others, by implementing autonomous path generation with path optimization for synthetic scene data to train machine learning models used to control an AV (e.g., to predict drivable lanes from onboard observations). The synthetic scene data can be used to train machine learning models for scene understanding without requiring "real" annotated (e.g., labeled) data, and can help augment such "real" annotated data. For example, if the synthetic scene is a synthetic construction zone, the synthetic construction zone data can be generated to include object configurations (e.g., synthetic cones, construction vehicles, construction signs, direction signs, speed limit signs, road blocks, etc.) and a polyline graph representing the "roadgraph" inside of the synthetic construction zone. For example, the polyline graph representing the "roadgraph" can be generated with information including the layout of the construction zone, and the object configurations can be generated with information including the ground-truth cone boundaries and drivable lanes in the construction zone area. The layout of the construction zone can include positions of construction cones, vehicles, construction workers, etc.

As discussed above, the synthetic scenes can be generated by automatically generating ground-truth annotations (e.g., labels) for the synthetic scene using a roadgraph solver. The roadgraph solver can modify an original roadgraph representing an original layout of driving paths without an object configuration to obtain a modified roadgraph representing a changed layout of driving paths (based on the original layout). For example, the object configuration can reflect a construction zone that blocks at least one path of the original layout, and the changed layout can include optimal path(s) or detours that traffic should take due to construction.

The roadgraph solver can identify an optimal path in view of the object configuration. The optimal path can have an optimal cost value. In some implementations, multiple techniques can be employed to identify the optimal path. For example, a path can be selected using a coarse-optimization technique to obtain a coarse-optimized path, and the coarse-optimized path can be modified using a fine-optimization technique to obtain a fine-optimized path to generate the synthetic scene. The coarse-optimization technique can be a discrete path optimization technique employed using dynamic programming. The fine-optimization technique can be a continuous path optimization technique. For example, the fine-optimization technique can be employed using an iterative Linear Quadratic Regulator (iLQR).

Aspects and implementations disclosed herein provide numerous advantages over existing technologies. For example, generating synthetic scene data can increase scale and diversity that can be used to effectively train machine learning models for autonomous vehicle operation. Additionally, the synthetic construction zone data can be generated to be configurable for various scene test cases. Use cases for the synthetic scene data include, but are not limited to, ramping up machine learning models, generating fully-controllable test cases, training a machine learning model jointly with manually-labeled data, and performing targeted augmentation for long-tail cases.

FIG. 1 is a diagram illustrating components of an example autonomous vehicle (AV) 100 capable of using motion patterns for object classification and tracking, in accordance with some implementations of the present disclosure. FIG. 1 illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the ultraviolet range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion.

The sensing system 120 can include one or more lidar sensors 122 (e.g., lidar rangefinders), which can be a laser-based unit capable of determining distances (e.g., using ToF technology) to the objects in the driving environment 110. The lidar sensor(s) can utilize wavelengths of electromagnetic waves that are shorter than the wavelength of the radio waves and can, therefore, provide a higher spatial resolution and sensitivity compared with the radar unit. The lidar sensor(s) can include a coherent lidar sensor, such as a frequency-modulated continuous-wave (FMCW) lidar sensor. The lidar sensor(s) can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 units can be mounted on AV, e.g., at different locations separated in space, to provide additional information about a transverse component of the velocity of the reflecting object, as described in more detail below.

The lidar sensor(s) 122 can include one or more laser sources producing and emitting signals and one or more detectors of the signals reflected back from the objects. The lidar sensor(s) 122 can include spectral filters to filter out spurious electromagnetic waves having wavelengths (frequencies) that are different from the wavelengths (frequencies) of the emitted signals. In some implementations, the lidar sensor(s) 122 can include directional filters (e.g., apertures, diffraction gratings, and so on) to filter out electromagnetic waves that can arrive at the detectors along directions different from the retro-reflection directions for the emitted signals. The lidar sensor(s) 122 can use various other optical components (lenses, mirrors, gratings, optical films, interferometers, spectrometers, local oscillators, and the like) to enhance sensing capabilities of the sensors.

In some implementations, the lidar sensor(s) 122 can scan 360-degree in a horizontal direction. In some implementations, the lidar sensor(s) 122 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate at generally in the near-infrared wavelength, but may include sensing technology that operate at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 130 can include a perception system 132. The perception system 132 can be configured to detect and/or track objects in the driving environment 110 and to recognize the objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse, as described below) of such objects. In some implementations, the perception system 132 can use the lidar data in combination with the data captured by the camera(s) 129. In one example, the camera(s) 129 can detect an image of a scene, such as a construction zone scene. Using the data from the camera(s) 129, lidar data, etc., the perception system 132 can be capable of determining the existence of objects within the scene (e.g., cones). For example, the perception system 132 can include a scene recognition component 133. The scene recognition component 133 can receive data from the sensing system 120, and can identify a scene (e.g., a construction zone scene) based on the data.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GPS data processing module 134, and the environment monitoring and prediction component 136, and a synthetic scene data trained model 142, can be received by an autonomous driving system, such as AV control system (AVCS) 140. The AVCS 140 can include one or more algorithms that control how the AV is to behave in various driving situations and environments. The synthetic scene data trained model 142 is a model trained using synthetic data. The synthetic data can include synthetic scenes (e.g., synthetic construction zone scenes) generated by a synthetic data generator using a roadgraph solver, as will be described in further detail herein. For example, the synthetic data generator can be implemented on an offboard system. As another example, the synthetic data generator can be implemented as part of the perception system 132.

For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (cones, rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

Figure 2:
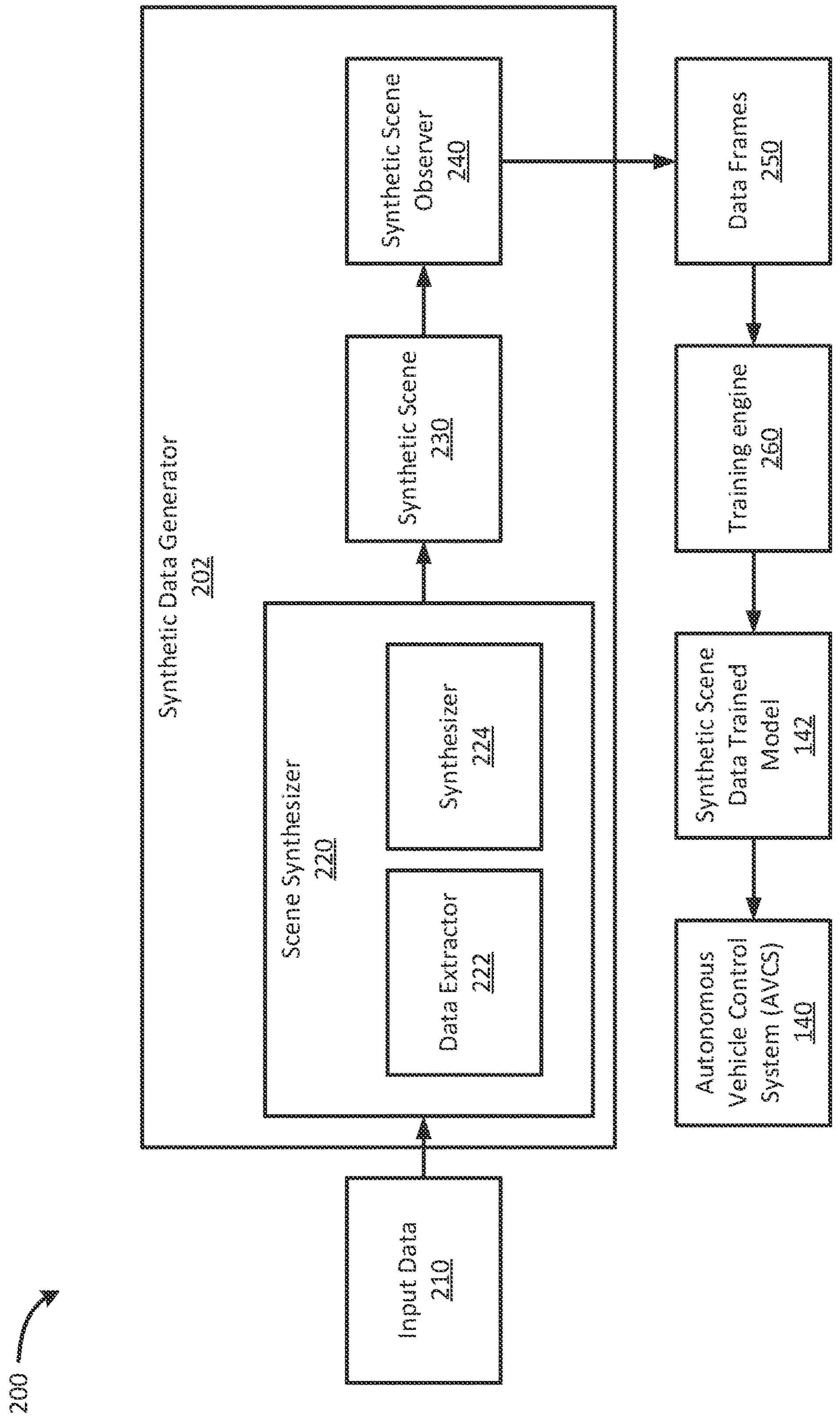
FIG. 2 is a diagram illustrating an example system for generating and utilizing synthetic scenes, in accordance with some implementations of the present disclosure.

FIG. 2 is a diagram illustrating a system 200 for generating and utilizing synthetic scenes, in accordance with some implementations of the present disclosure. In some implementations, the system 200 can be included within an offboard perception system that is physically separate from an autonomous vehicle (AV) (e.g., offboard AV server). In some implementations, the system 200 can be included within an onboard perception system of the AV. As shown, input data 210 is received by a scene synthesizer 220. The input data 210 can include one or more messages of real run segments without scenes. A real run segment refers to a segment of the road that is actually driven and imaged (e.g., by cameras and/or lidars). For example, the one or more messages can include one or more comms messages (e.g., based on the images taken by cameras and/or lidars).

The scene synthesizer 220 analyzes the input data 210 to automatically generate a synthetic scene. In some implementations, the synthetic scene includes a synthetic construction zone. As will be discussed in more detail below, the synthetic scene can be generated using a roadgraph solver in view of an object configuration.

In some implementations, the scene synthesizer 220 includes a data extractor 222 and a synthesizer 224. The data extractor 222 can extract data of interest from the input data 210 to obtain extracted data. For example, extracted data can include an original roadgraph including a set of paths, an AV trajectory, etc. Extracting the data of interest can include receiving a set of messages of a run segment, selecting one or more messages of the set of messages to obtain one or more messages of interest with respect to scene synthesis, and organizing the one or more messages of interest into a set of synchronized frame.

For example, the set of messages can be received as a temporally ordered list (e.g., by timestamp), and selecting the one or more messages can include analyzing the set of messages in temporal order. Each message of interest can have a corresponding type (e.g., pose, localize pose, perception objects, sensor field-of-view, marker detection results), and each synchronized frame can include every type of message of interest, with one message of interest for each type. The timestamps of messages of interest within one synchronized frame can be sufficiently close such that it is reasonable to treat those messages of interest as having occurred simultaneously.

The extracted data can then be used by the synthesizer 224 to generate a synthetic scene 230. For example, the synchronized frames can be received by the synthesizer 224 to generate the synthetic scene 230. Use cases include (1) extracting autonomous vehicle trajectories for constraining the location of a synthetic construction zone; (2) determining a piece of the original roadgraph on which the synthetic scene 230 is generated; and (3) providing useful information for synthetic scene generation (e.g., moving/parked vehicles, sensor field-of-view).

To generate the synthetic scene, 230, the synthesizer 224 can automatically generate ground-truth annotations (e.g., lane annotations and boundary annotations) for the synthetic scene 230 based on the original roadgraph and the synthetic scene configuration, and the ground-truth annotations should have a sufficiently smooth and reasonable geometry so as to not run into scene artifacts or objects. For example, in the case that the synthetic scene 230 is a synthetic construction zone, ground-truth annotations can point out the possible paths for driving through the construction zone scene, and should have a sufficiently smooth and reasonable geometry so as it not run into construction zone objects (e.g., cones, construction vehicles, construction signs).

To generate the ground-truth annotations, a modified roadgraph can be obtained by modifying the original roadgraph in a manner reflecting a possible real scene (e.g., real construction zone scenario). For example, scene semantics and a synthetic object configuration can be defined within the original roadgraph, and the original roadgraph can be modified by shifting a path and/or merging a path to a neighboring path in view of the scene semantics and the object configuration. That is, the original roadgraph represents an original layout of driving paths without any indication of a construction zone, and the modified roadgraph represents a changed layout of driving paths (based on the original layout) reflecting a construction zone to be defined within the synthetic scene 230 (e.g., when traffic needs to be directed to a different path due to construction). Accordingly, the modified roadgraph includes the ground-truth lanes of the synthetic scene 230.

In some implementations, the synthetic object configuration can include placement of one or more synthetic objects into the original roadgraph, and the modified roadgraph includes ground-truth lanes of the synthetic scene 230. For example, if the synthetic object configuration includes a set of cones defining a boundary of a construction zone, a modified roadgraph can be obtained by shifting and/or merging one or more lanes around the boundary of the construction zone. The synthetic scene 230 can reside in any suitable coordinate system in accordance with the implementations described herein. For example, the synthetic scene 230 can reside in a latitude-longitude-altitude (lat-lng-alt) coordinate system. A high-level overview of a process of converting a roadgraph to a modified roadgraph including synthetic objects using the synthesizer 224 will be described in more detail below with reference to FIG. 3.

In some implementations, the synthetic scene 230 can be provided to a synthetic scene observer 240. The synthetic scene observer 240 can observe the synthetic scene 230 by taking a series of "screenshots" of the synthetic scene 230 from a perspective or viewpoint of the AV to generate a set of data frames 250 including one or more object frames. That is, the synthetic scene observer 240 can simulate the perceived processing of a scene by an AV onboard perception system (e.g., perception system 132 of FIG. 1). For example, an observation frame can be generated by converting the synthetic scene 230 into a local perception coordinate frame (e.g., smooth coordinate frame) of the AV for model training. Then, a visibility test for each synthetic artifact can be performed according to, e.g., a sensor field-of-view, or a circle with a predefined radius within which objects are considered visible. Visible objects can be added into the observation frame, while non-visible objects are not included in the observation frame. Optionally, marker observations for painted markers can also be included in the observation frame. Such marker observations can be acquired from onboard modules for painted marker detection, or can be synthesized by converting the lane markers in the roadgraph. The marker observations can be stored in the observation frames as polylines. Observation frames can be generated from multiple viewpoints, including top-down view, perspective view, etc.

To generate the set of data frames 250, the synthetic scene observer 240 can receive additional input data. The additional input data can include streaming AV poses and streaming perception field-of-view. The synthetic scene observer

240 can handle a variety of aspects, including pose divergence, synthetic object visibility and synthetic data format.

Pose refers to a definition of the location of the AV. For example, pose can include one or more of coordinates, roll, pitch, yaw, latitude, longitude, altitude, etc. Regarding pose divergence (e.g., due to the location divergence for navigating the synthetic scene not existing in the real log), synthetic scenes (e.g., synthetic construction zones) can be split into two categories: synthetic scenes that affect the AV's proceeding and synthetic scenes that do not affect the AV's proceeding. By being synthetic, the synthetic scenes do not really exist in the real log. Thus, the AV's pose may need to be modified, which introduces pose divergence. In general, a limited amount of pose divergence can be acceptable (e.g., within about 5 meters). Too large of a pose divergence can make perception unrealistic.

Regarding synthetic object visibility, to simulate what can be observed from an onboard perception system (e.g., perception system 132 of FIG. 1), the AV's pose and perception field-of-view can be used at a particular timestamp to filter out synthetic objects that are not visible to the AV (e.g., occluded and/or too far away from the AV).

Regarding synthetic data format, at least two forms of data can be generated. For example, one form of data can be used to simulate onboard usage, and another form of data can be used for training and testing machine learning models. For onboard usage, the synthetic cones can be wrapped in the same format as onboard real cones, and published in a similar frequency (e.g., from about 10 Hz to about 15 Hz) as alps_main does. The onboard usage data can be stored in a suitable format (e.g., a .clf log format).

The set of data frames 250 can be used to generate a set of target output data for model training. For example, the set of target output data generated based on the set of data frames 250 can include messages (e.g., comms messages) with injected markers and/or perception objects, tensorflow examples, etc.

The set of data frames 250 and the set of target output data can then be provided to a training engine 260 to train a machine learning model, such as the synthetic scene data trained model 142, used to navigate the AV. For example, the machine learning model can be trained to learn how to react to a particular scene (e.g., construction zone) encountered while the AV is in operation. The synthetic scene data trained model 142 can then be used by the AVCS 140 to control how the AV is to behave in various driving situations and environments.

Figure 3:
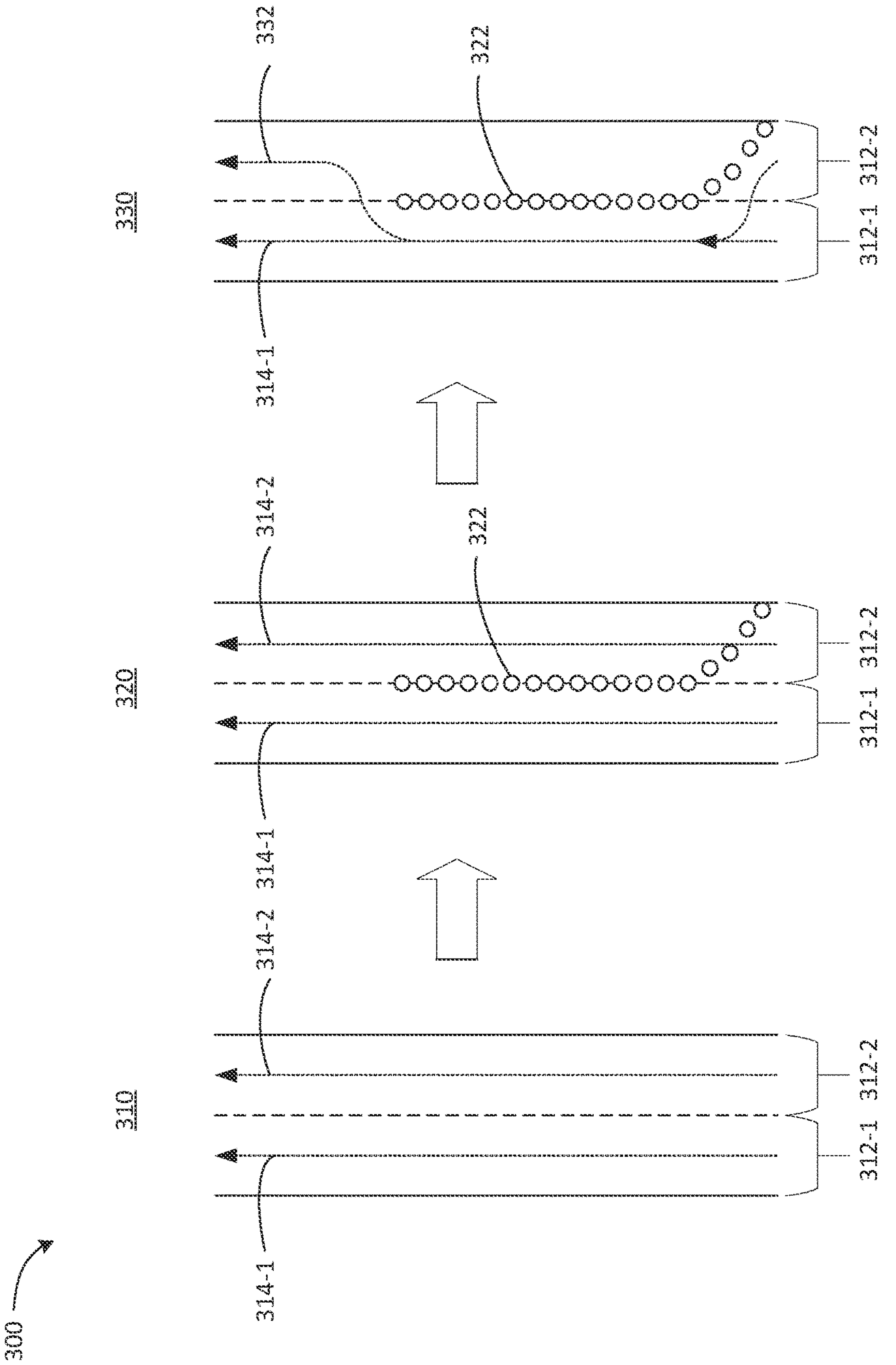
FIG. 3 is a diagram illustrating the conversion of an original roadgraph to a modified roadgraph including synthetic objects, in accordance with some implementations of the present disclosure.

FIG. 3 depicts a diagram 300 illustrating the conversion of an original roadgraph to a modified roadgraph including synthetic objects, in accordance with some implementations of the present disclosure. For example, the diagram 300 can reflect a synthetic construction zone scene. However, such an implementation should not be considered limiting.

As shown, the diagram 300 depicts an original roadgraph 310 having a first roadgraph lane 312-1 and a second roadgraph lane 312-2. A first roadgraph path 314-1 associated with a path of an AV driving within the first roadgraph lane 312-1 and a second roadgraph path 314-2 associated with a path of an AV driving within the second roadgraph lane 312-2 are shown. For purposes of this illustrative example, the roadgraph paths 314-1 and 314-2 are proceeding in the same direction to simulate that traffic should be moving in the same direction within each of the roadgraph lanes 312-1 and 312-2. However, in other implementations, one of the roadgraph paths 314-1 or 314-2 can proceed in an opposite direction to simulate that traffic should be moving in opposite directions.

The diagram 300 further depicts the original roadgraph 310 with defined synthetic scene semantics and an object configuration, denoted as 320. A number of synthetic artifacts or objects 322 have been placed to define a region within the synthetic scene. For example, the synthetic artifacts 322 can represent a number of cones placed along the boundary of a synthetic construction zone.

The diagram 300 further depicts a modified roadgraph 330 obtained by modifying the original roadgraph in view of the scene semantics and the object configuration (e.g., the synthetic objects 322). In this illustrative example, to simulate how a path change can occur to simulate a synthetic construction zone, the corresponding portion of the roadgraph path 314-2 from the original roadgraph 310 is shifted and merged into the roadgraph path 314-1 to generate a modified second path 332. That is, the modified second path 332 is generated after the object configuration is defined.

The original roadgraph itself may not be designed to be modifiable. In order to modify the original roadgraph, the original roadgraph can be represented by a mutable version of the original roadgraph, or mutable roadgraph. A mutable roadgraph is a data structure that, at a high level, represents a graph of paths. New paths can be attached to spots on the existing graph, existing paths could be disabled, etc. A building block of a mutable roadgraph is referred to an abstract path. An abstract path is a data structure that defines a one-dimensional (1D) space, and stores properties of a synthetic construction zone at various locations of the roadgraph (e.g., using offsets from any suitable reference location). Examples of such properties include, but are not limited to, path center location, path heading, distance to left/right boundaries, speed limit, drivability, etc. The abstract path data structure can have a number of derived classes. One derived class is referred to as "roadgraph path" and represents unchanged roadgraph paths in the original roadgraph. Path properties can be derived from the original roadgraph. Another derived class is referred to as "synthetic path" and represents modified paths during the scene synthesis process. Synthetic path properties can be specified during path creation.

During the scene generation process, the scene synthesizer 220 can implement stochastic sampling and a roadgraph solver. The stochastic sampling generates a scene configuration and semantics without lane labels, and the roadgraph solver automatically generates the ground-truth lane annotations (e.g., labels). In some implementations, the stochastic sampling is enabled using a probabilistic programming language. With the probabilistic programming language, a programmatic synthetic scene generation process for any scene type can be supported. After the scene synthesizer 220 has generated one or more synthetic scenes, the roadgraph solver can generate lane annotations automatically. In some implementations, in the context of a construction zone, the roadgraph solver can also automatically deform lanes in view of a construction zone placed within the scene. Further details regarding the probabilistic programming language and the roadgraph solver will now be described below with reference to FIG. 4.

Figure 4:
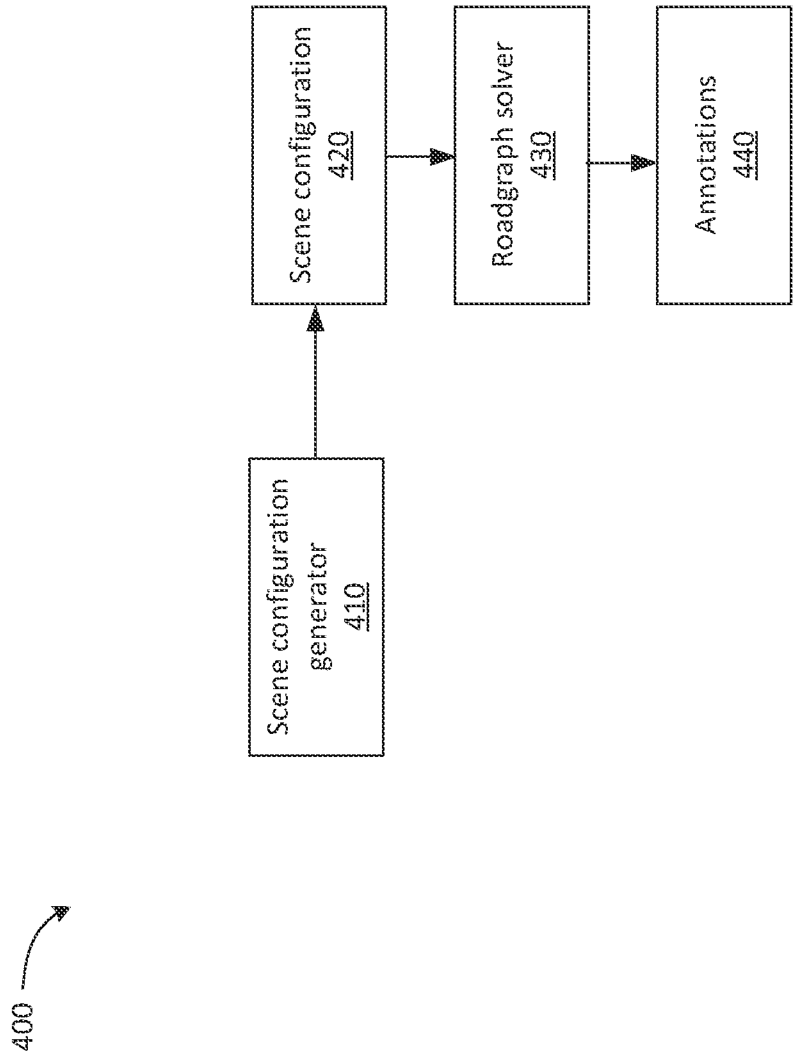
FIG. 4 is a diagram illustrating a framework for generating synthetic scenes, in accordance with some implementations of the present disclosure.

FIG. 4 is a diagram illustrating a framework 400 for generating synthetic scenes, in accordance with some implementations of the present disclosure. As shown, the framework 400 can include a scene configuration generator 410 configured to generate a scene configuration 420. To generate realistic and diverse scene data (e.g., construction zone data), samples can be obtained from a library of scene types (e.g., construction zones) that simulate a "real scene." Such a scene generation can be extremely hard to model. For example, on the one hand, data scarcity can limit the use of modern deep generative models and, on the other hand, the enormous real-world variety can be impossible to capture with a single rule-based system.

To address this, the scene configuration generator 410 can generate the scene configuration 420 based on a scene type library. For example, the scene type library can include a number of scene types (or script types) each corresponding to a scene synthesizer, and a weighted combination of each scene type can approximate the distribution of all scenes to obtain a scene configuration.

The distribution of scene types can be generated by multiple scene synthesizers. The scene synthesizers can include at least some of the following features: (1) each scene synthesizer models its corresponding distribution of a specific subset of scene types (e.g., "lane shift due to a construction zone along road edge," "small construction zone inside an intersection," etc.); (2) each scene synthesizer shares a common interface, so they can replace each other, or be freely combined with weights; (3) each scene synthesizer is independent from one another, so many entities can contribute to the scene synthesizers in at the same time; and (4) sufficient functionality to enable addition of new scene types to the scene type library.

In some implementations, the scene configuration generator 410 can implement a probabilistic programming language (PPL). The PPL is a light-weight framework, which can be nested in any suitable general-purpose programming language (e.g., C++). The PPL can include two parts: (1) a definition of scene distributions and (2) a universal sampling engine that samples from the library of scene types according to a suitable scene distribution. A scene distribution is defined as a function, where a prior distribution ("prior") and a set of conditions or constraints can be specified (e.g., by a user). A prior distribution is a spatial relationship graph with randomness, which can be built with libraries in a codebase (e.g., math/geometry/roadgraph libraries). As will be described in further detail herein, the PPL module 410 can employ stochastic spatial referencing and conditioned sampling.

The set of constraints can include one or more hard constraints and/or one or more soft constraints. A hard constraint can be a user-defined Boolean expression. For all sampled scenes, each hard constraint will hold true. A soft constraint is used to ensure that a certain variable follows a user-defined distribution. The soft constraint associates the variable within the scene generation process with a probability density function (continuous or discrete) and, for all sampled scenes, the distribution of the variable will follow the probability density function.

Instead of directly specifying the scene configuration 420 (e.g., by setting up coordinates of each object in the scene), a scene can be described with spatial relationships (e.g., stochastic spatial relationships). The spatial relationships can define the generative procedure of the scenes. One benefit of expressing a scene in this manner is that, once defined, the scene can be generated at any suitable location. Such a property improves the generalization capacity of machine learning models trained on the synthetic scene data. For a target scene, the model can learn to handle the scene in a location-agnostic manner (in any city, town, etc.). An example spatial relationship will now be described below with reference to FIGS. 5A-5B.

Figure 5A:
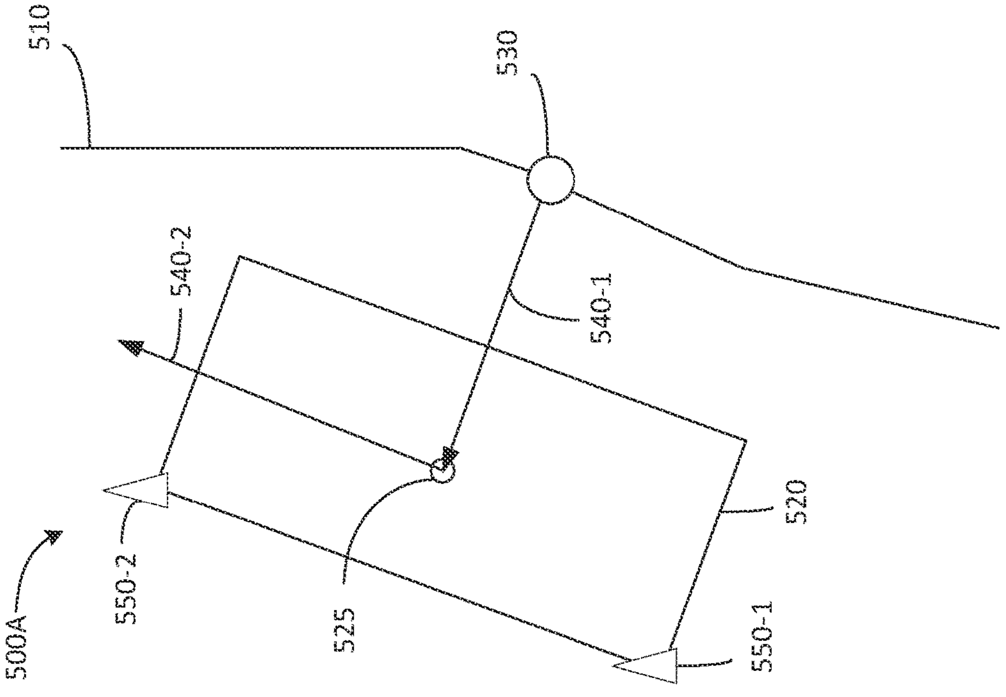
FIG. 5A is a diagram illustrating an example scene configuration, in accordance with some implementations of the present disclosure.

FIG. 5A is a diagram illustrating an example scene configuration 500A, in accordance with some implementations of the present disclosure. The scene configuration 500A is illustratively depicted as a construction zone scene. However, any suitable scene configuration can be obtained in accordance with the implementations described herein.

As shown, the scene configuration 500A includes a boundary curve 510 and a construction zone 520 at a position relative to the boundary curve 510. For example, the boundary curve 510 can be a curve corresponding to a curb. The construction zone 520 in this example is in the shape of a rectangle. However, the construction zone 520 can be embodied in any suitable shape in accordance with the implementations described herein. A reference point 530 along the boundary curve 510 is sampled along the curve. Then, a normal vector 540-1 and a tangent vector 540-2 corresponding to the reference point 530 can be queried. Based on the vectors 540-1 and 540-2, a set of parameters of the construction zone 520 can be sampled. The parameters of the construction zone can include, e.g., the center of the construction zone 520, denoted as center point 525, orientation of the construction zone 520, width of the construction zone 520, and length of the construction zone 520. As indicated by the normal vector 540-1 and the tangent vector 540-2, the center 525 can be at an offset along the normal direction, orienting at the tangent direction. A number of objects can be placed along the construction zone 520. In this example, a first cone, Cone 1 550-1, is placed at a first corner of the construction zone 520 and a second cone, Cone 2 550-2, is placed at a second corner of the construction zone 520. Locations of Cone 1 550-1 and Cone 2 550-2 can be determined from the set of parameters (e.g., dimensions) of the construction zone 520. Once defined, the scene configuration 500A can be placed at any suitable location. For example, the scene configuration 500A can be placed anywhere in relation to a boundary curve (roadway, lane, curb, etc.).

In the "real-world," the two cones 550-1 and 550-2 can represent the construction zone 520 as a region where a construction or work zone vehicle is present. The parameters of the construction zone 520 can correspond to the physical parameters (e.g., dimensions) of the construction or work zone vehicle (e.g., length, width and orientation of the construction or work zone vehicle). Moreover, the right edge of the construction zone 520 can be defined by other vehicles located in proximity to the boundary curve 510 (e.g., parallel parked vehicles).

Figure 5B:
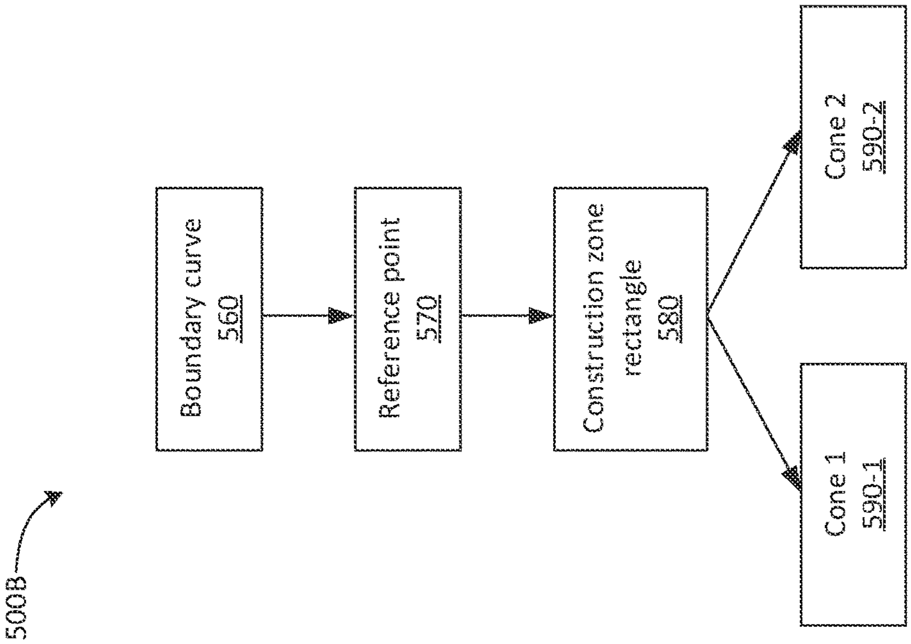
FIG. 5B illustrates a sample dependency graph based on the scene configuration of FIG. 6A, in accordance with some implementations of the present disclosure.

FIG. 5B is a dependency graph 500B of the scene configuration 500A, in accordance with some implementations of the present disclosure. The dependency graph 500B includes a boundary curve node 560 corresponding to boundary curve 510, a reference point node 570 corresponding to reference point 540, a construction zone node 580 corresponding to construction zone 530, a Cone 1 node 590-1 corresponding to Cone 1 530-1, and a Cone 2 node 590-2 corresponding to Cone 2 530-2.

Real scenes (e.g., construction zone scenes) can have large internal variance in their appearance. Even if one single type of scene is created at the same location twice, the result will likely be different. For example, in a construction zone, noise in object placement (e.g., cones), the size of construction vehicles, the preferences of construction workers, etc. can contribute to such different results. Such intraclass variances (e.g., within a single scene type) can be captured by synthetic data to generalize machine learning models. For example, intraclass variances can be addressed by adding randomness into the spatial relationships (e.g., random shapes, sizes, and orientations).

Referring back to FIG. 4, after the scene configuration 420 is obtained, a roadgraph solver component 430 implements a roadgraph solver. The roadgraph solver can be used to automatically generate ground-truth annotations ("annotations") 440 in view of the scene configuration 420. For example, the annotations 460 can include lane annotations (e.g., lane labels). The roadgraph solver component 430 can receive information including polygons, road edges, etc., that can be used to obtain a modified roadgraph. That is, the roadgraph solver component 430 can solve for a modified roadgraph by deforming or modifying an original roadgraph, in view of the scene semantics and object configuration within the scene configuration 420. Any suitable method can be implemented by the roadgraph solver component 430 to automatically generate the annotations 440 in accordance with the implementations described herein. As discussed above, the annotations 440 can include an identification of driving paths associated with the modified roadgraph.

Figure 6A:
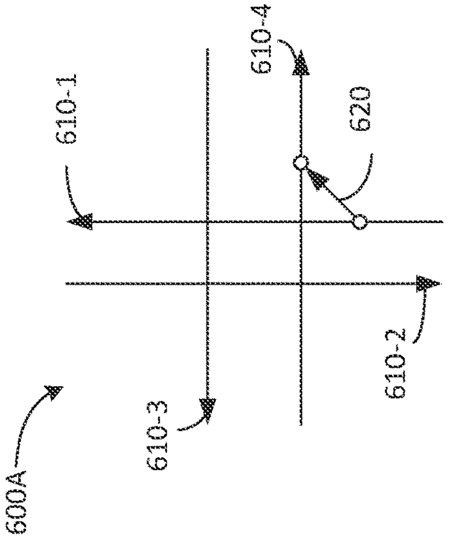
FIGS. 6A-6D are diagrams illustrating an example application of a roadgraph solver, in accordance with some implementations of the present disclosure.
Figure 6B:
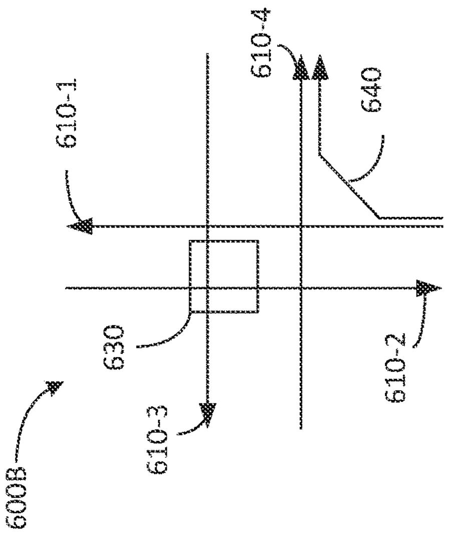
Figure 6C:
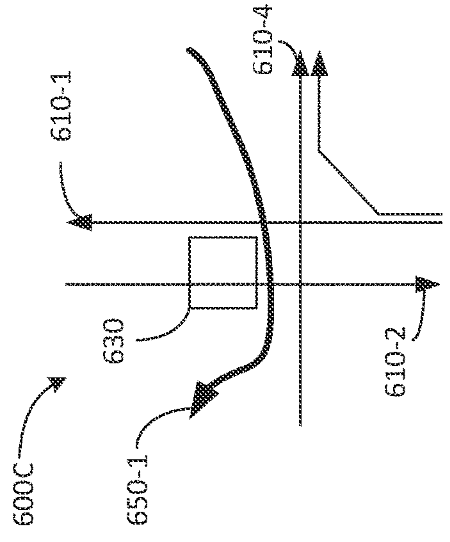
Figure 6D:
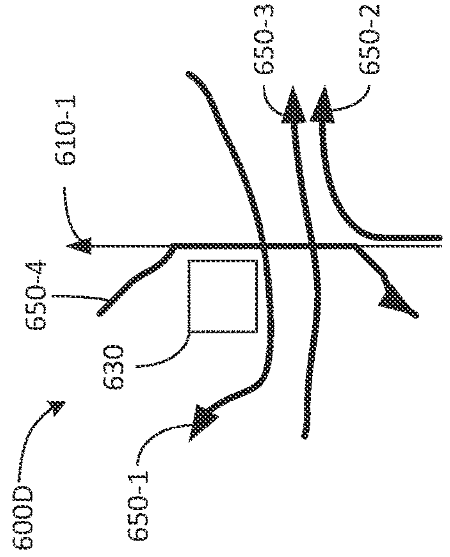

FIGS. 6A-6D are diagrams 600A-600D illustrating generation of annotations including identification of driving paths associated with a modified roadgraph, in accordance with some implementations of the present disclosure. For example, the annotations, including identification of driving paths associated with a modified roadgraph, can be generated by a roadgraph solver such as the roadgraph solver component 430 of FIG. 4. In FIG. 6A, diagram 600A is shown including paths 610-1 through 610-4. An additional path 620 (e.g., a short-cut road, line-turn lane, a ramp, etc.) is shown connecting path 610-1 and path 610-4. That is, diagram 600A corresponds to an original roadgraph. In FIG. 6B, diagram 600B is shown including a zone 630 and a path 640 (e.g., a right turn to a parallel road, a detour road, a bypass road, etc.). The zone 630 can be an obstacle affecting paths of the original roadgraph (e.g., a construction zone). In FIG. 6C, an optimization process is initiated to identify a set of candidate paths that avoid the obstacle zone 630, where each candidate path is associated with a cost value. For example, the paths of the original roadgraph are modified in view of the zone 630 to produce the set of candidate paths that avoid the obstacle zone 630. Out of the set of candidate paths, a candidate path 650-1 with an optimal cost value is selected to replace affected path 610-3. In FIG. 6D, in addition to path 650-1, new paths 650-2 through 650-4 are generated (using the optimization process) to replace affected paths 610-2 and 610-4 (e.g., by deforming paths 610-2 and 610-4). Path 650-4 merges into path 610-1. Accordingly, the optimization process is performed to solve for paths that can evade the blockage resulting from the zone 630.

Figure 7:
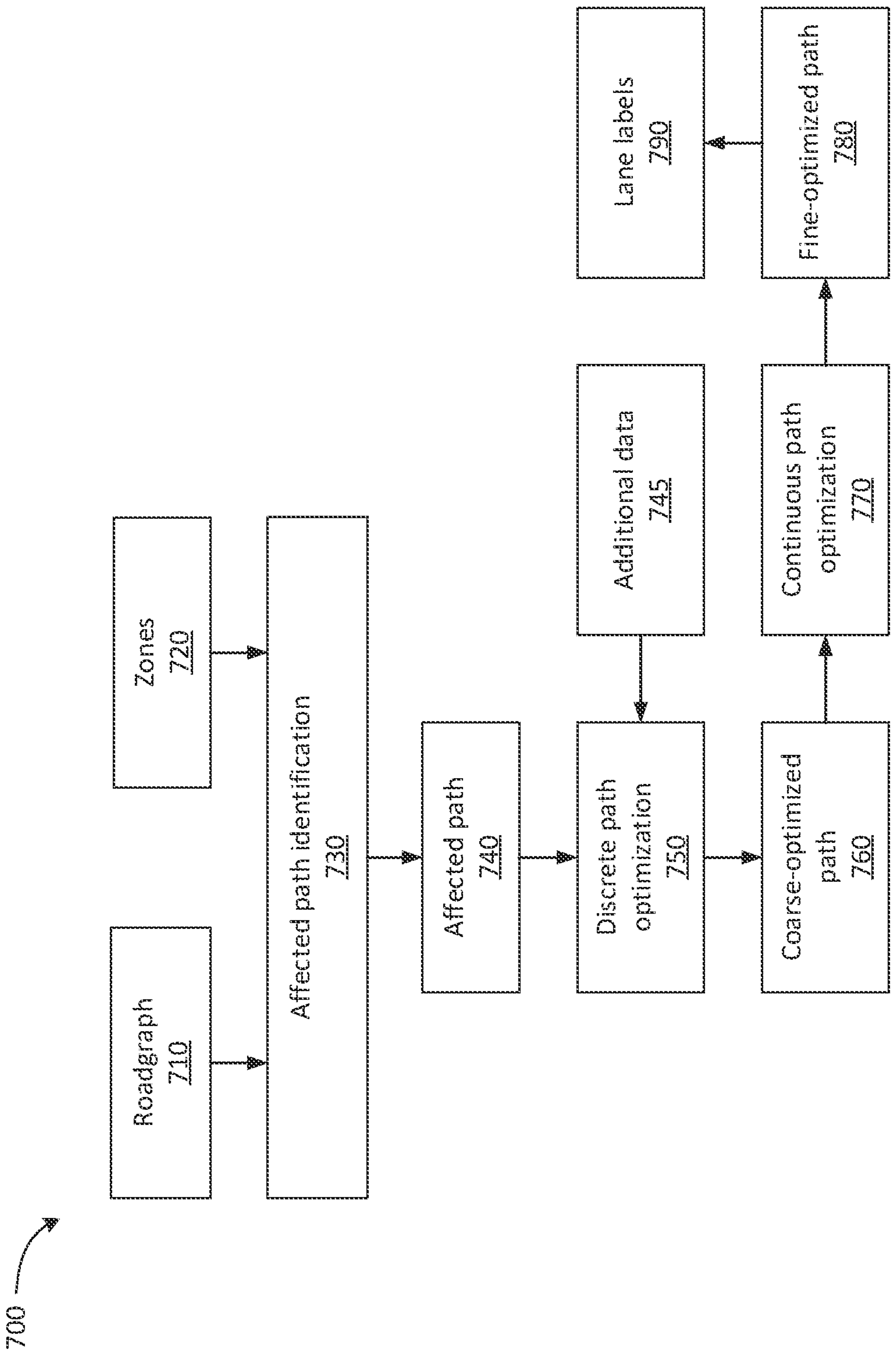
FIG. 7 is a diagram illustrating an example system for implementing a roadgraph solver, in accordance with some implementations of the present disclosure.

FIG. 7 is a diagram illustrating an example system 700 for implementing a roadgraph solver, in accordance with some implementations of the present disclosure. The system 700 can be implemented within a roadgraph solver component, such as the roadgraph solver component 430 of FIG. 4.

As shown, a mutable roadgraph ("roadgraph") 710 and a set of zones 720 (e.g., construction zones) are received by an affected path identification component 730. The roadgraph 710 and the set of zones 720 can be included within a scene configuration, such as the scene configuration 420 of FIG. 4. The set of zones 720 can include polygons.

The affected path identification component 730 can identify an affected region in view of the set of zones 720, and identify at least one affected path ("affected path") 740 of the roadgraph 710 in view of the set of zones 720. The affected path 740 (e.g., paths 650-*x* of FIG. 6D) can be identified based on a minimum distance to the affected region.

A two-stage optimization process can be performed based on the affected path 740 to find a path that evades a zone (e.g., construction zone 630 of FIGS. 6B-D). The two-stage optimization process can implement reinforcement learning to find an optimal path that will evade obstacles (e.g., zones, road edges), attempt to stay close to the affected path 740, and be smooth.

For example, as shown, the affected path 740 can be received by a discrete path optimization component 750. The discrete path optimization component 750 can perform coarse optimization to generate at least one coarse-optimized path ("coarse-optimized path") 760 from the affected path 740. The goal of the coarse optimization is to provide a suitable initialization for fine optimization, as will be described in further detail below. Additional data 745 can be received by the discrete path optimization component 750. The additional data 745 can include additional roadgraph modification information. Examples of data that can be included in additional data 745 include, but are not limited to, data related to where to place path closures, data related to which direction to shift the path, data related to where to place a multi-lane shift, etc. For example, a dynamic programming method can be used by the discrete path optimization component 750 to perform the coarse-optimization. Further details regarding the operation of the discrete path optimization component 750 will now be described below with reference to FIG. 8.

Figure 8:
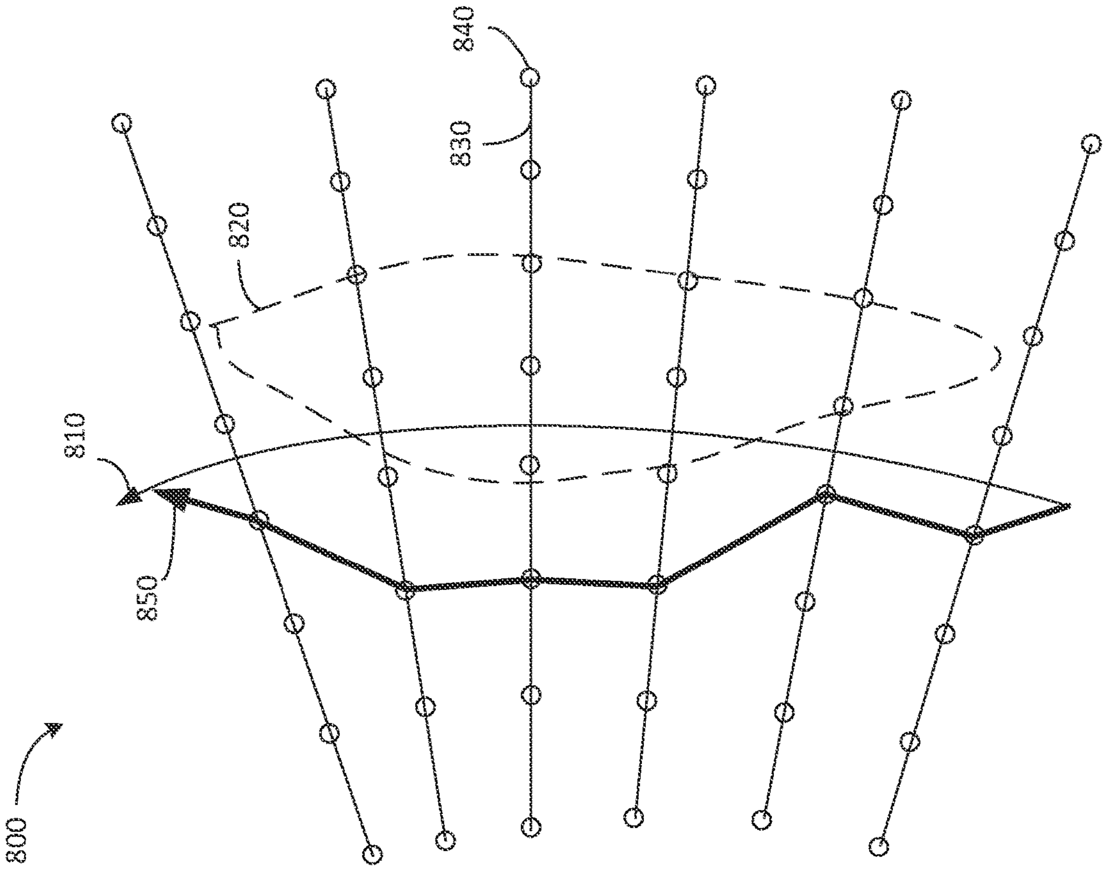
FIG. 8 is a diagram illustrating an example of discrete path optimization performed to obtain at least one coarse-optimized path, in accordance with some implementations of the present disclosure.

FIG. 8 is a diagram 800 illustrating an example of discrete path optimization performed to obtain at least one coarse-optimized path, in accordance with some implementations of the present disclosure. For example, the discrete path optimization can be performed by the discrete path optimization component 750 of FIG. 7.

The diagram 800 shows an original path 810 that is affected by a zone 820 (e.g., a construction zone). Thus, discrete path optimization will be performed to identify a coarse-optimized path that can replace the original path 810. To do so, the dynamic programming method can implement: (1) a search space; (2) a cost function; and (3) an optimization method.

Regarding the search space, the search space can include paths defined on a discrete grid around the candidate path. Such a grid can have two dimensions: steps—positions along the candidate path; slots—for each step, the positions along the path's perpendicular direction at the step. Each path in the search space takes one slot at each step, sequentially from the first step to the last step. The path geometry is a polyline connecting the slots at each step. For example, as shown, a number of steps including step 830 and a number of slots including slot 840 are defined.

Regarding the set of cost functions, the goal of the discrete path optimization is to find candidate paths in the search space that are short and smooth, avoid non-drivable regions (e.g., curbs, construction zones), stay close to the original path, and have the same start and end point as the original path. Thus, the cost function can be based on a sum of the length of each polyline segment in the path, and the sum of the cost at each slot. If a slot falls inside of a non-drivable region, the cost associated with the slot is infinite. For the start and end point, any slot other than that corresponding to the original path is associated with an infinite cost. At each step, the cost can increase as the distance between a slot and the candidate path increases.

Regarding the optimization method, given the search space and the cost function, the optimization method is used to find the candidate path with the lowest cost. For example, the candidate path can be the cheapest path which passes through one slot per waypoint, and connected at the start point and at the end point.

The optimization method can be implemented with dynamic programming. For example, a dynamic programming method can be employed by filling a state value matrix based on the following equation:

$$state_{value}(i,j)=state_{cost}(i,j)+\min_k\{action_{cost}(i,j,k)+state_{value}(i+1,k)\}$$

where i corresponds to a current step, j corresponds to a slot at the current step i, k corresponds to a slot at a subsequent step i+1, $state_{value}(i,j)$ corresponds to the minimum cost for a path starting from slot j at step i, $state_{cost}(i,j)$ corresponds to the cost for being at slot j at step i, $action_{cost}(i,j,k)$ corresponds to the cost for moving from slot j to slot k, $state_{value}(i+1, k)$ corresponds to the minimum cost for a path starting from slot k at step i+1, and mink ( )minimizes over k. Since the value at step i depends on step i+1, the state value matrix can be filled backward starting from the last step. The state value matrix records the best slot to go for the next step. The dynamic programming method can be used to select the cheapest path by taking the best move of each step from the beginning (i.e., by obtaining the recorded best slots). In this example, the cheapest path is identified as coarse-optimized path 850.

Referring back to FIG. 7, the coarse-optimized path 760 is received by a continuous path optimization component 770 to "smooth out" the coarse-optimized path 760 and obtain at least one fine-optimized path ("fine-optimized path") 780. The fine-optimized path 780 is found by simulating how a vehicle would drive the path in a real-world environment. Each fine-optimized path, along with the unaffected paths of the roadgraph 710, are stitched together to form a graphical representation of lane labels ("lane labels") 790, from which a machine learning path prediction model can retrieve ground-truth data. Further details regarding the coarse-optimized path 760 and the fine-optimize path 780 will be described in further detail below with reference to FIG. 9.

The continuous path optimization component 770 can calculate an optimal path by optimizing one or more cost functions. In some implementations, the continuous path optimization component 770 implements a Linear Quadratic Regulator (LQR). For example, the LQR can be an iterative LQR (iLQR). Cost terms that can be included in the cost function include, but are not limited to, strict repellers from obstacles (e.g., zones and/or edges), attractors to stay close to the path 710 and to reach the goal, and constraints on physical states (e.g., speed, acceleration). Parameters and weights of the cost terms can be found by inverse reinforcement learning from real vehicle trajectories. For example, inverse reinforcement learning can search for the best set of parameters, such that when constraining the iLQR with the cost function, the resulting optimized path most closely resemble the real vehicle paths. Further details regarding the operation of the continuous path optimization component 770 will be described in further detail below with reference to FIG. 10.

One example of a cost function that can be optimized is a "reaching goal" cost function. The corresponding cost punishes a distance between the last point of the optimized trajectory to the goal location. The cost can be proportional to the square of the distance.

Another example of a cost function that can be optimized is a "follow candidate path" cost function. The corresponding cost punishes a deviation of the optimized path from the candidate path. The cost can be proportional to a sum of the minimal square distances from each point on the optimized path to the candidate path.

Another example of a cost function is an "evade obstacle" cost function. The corresponding cost strictly punishes the optimized path when it hits a non-drivable region (e.g., curb, construction zone). The cost can be proportional to a sum of cost terms for each point on the optimized path. For example, if a point is outside a non-drivable region by a constant margin (e.g., 2.0 meters), the corresponding cost term can be 0. Otherwise, the cost term can increase as a function of how deep inside the point is within the non-drivable region. For example, the cost term can increase as a square of the signed distance between the point and the polygon defining the non-drivable region (i.e. the cost term can increase quadratically).

Another example of a cost function is a "smooth path" cost function, which constrains the physical states in the path so it is reasonable for an AV to drive along. For example, the curvature of the path can be constrained to be small enough so that the AV can handle turns, acceleration will be sufficiently gentle so there is no handbrake use and/or impossible acceleration, etc.

Figure 9:
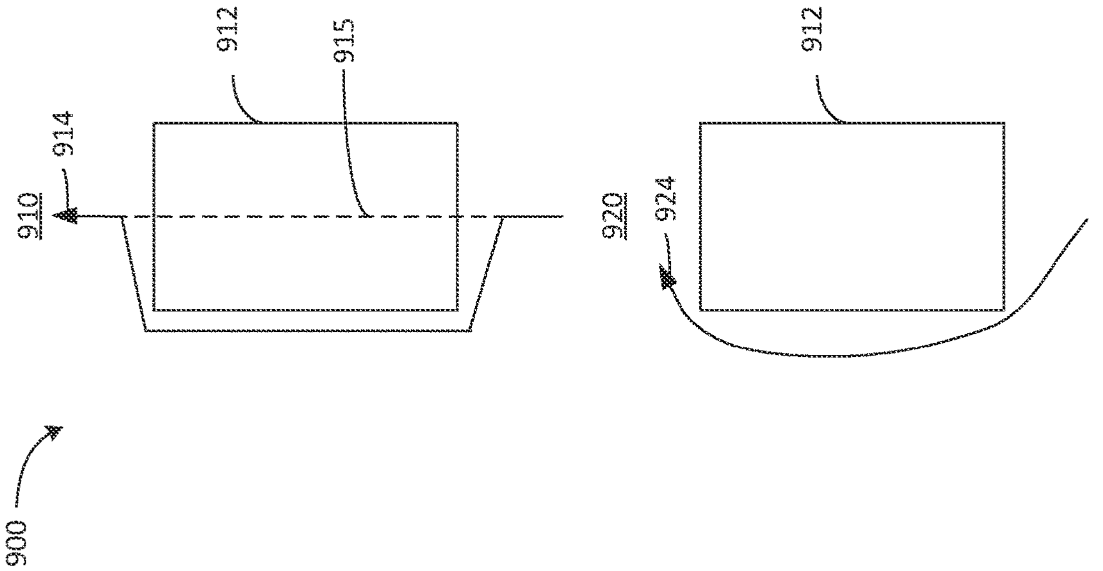
FIG. 9 is a diagram illustrating a coarse-optimized path and a fine-optimize path, in accordance with some implementations of the present disclosure.

FIG. 9 is a diagram 900 illustrating a coarse-optimized path and a fine-optimize path, in accordance with some implementations of the present disclosure. The diagram 900 includes a coarse-optimized path example 910 illustrating an obstacle 912 (e.g., zone) and a coarse-optimized path 920 formed from a number of discrete path segments that traverse about the obstacle 912. An outline of an original path 915 through the obstacle 912 is also shown. The diagram 900 further includes a fine-optimized path example 920 illustrating a fine-optimized path 922 formed from a continuous path segment that traverses about the obstacle 912.

Figure 10A:
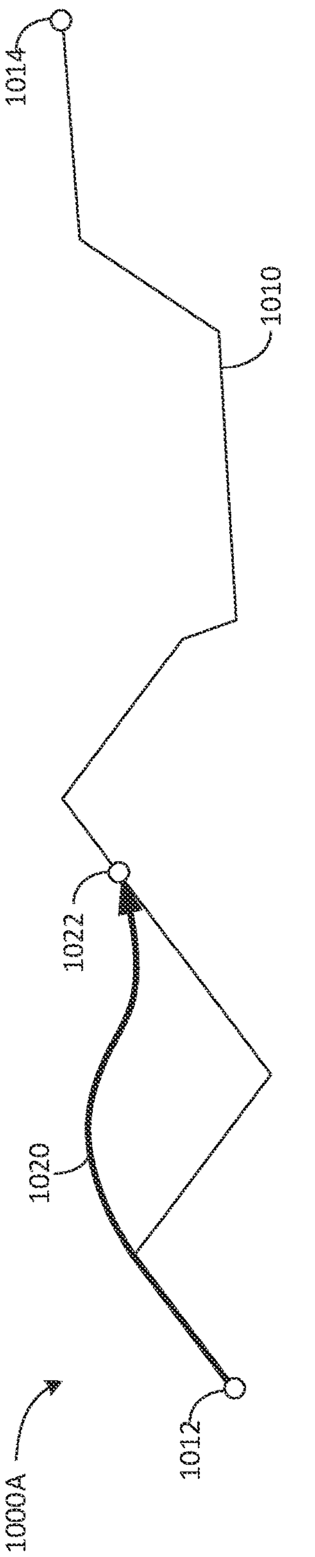
FIGS. 10A-10C are diagrams illustrating an example of continuous path optimization performed to obtain at least one fine-optimized path, in accordance with some implementations of the present disclosure.
Figure 10B:
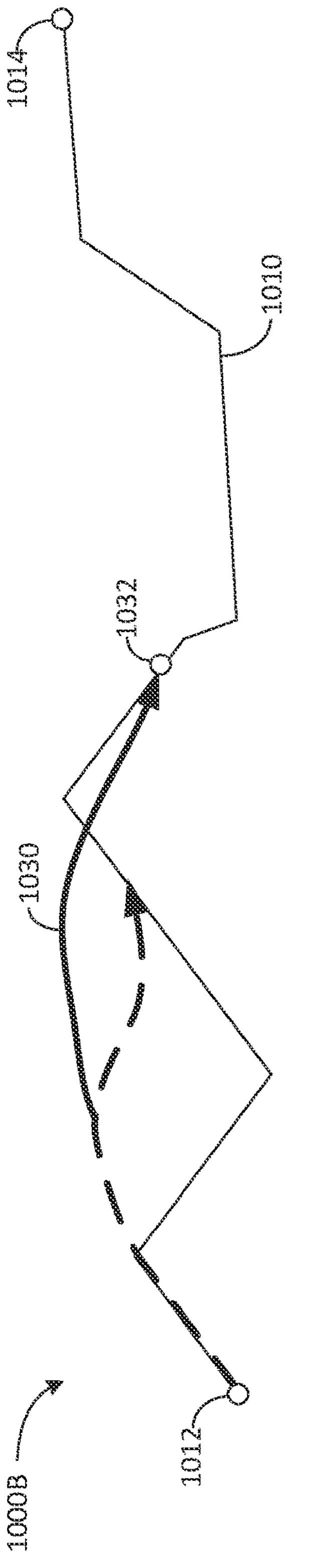
Figure 10C:
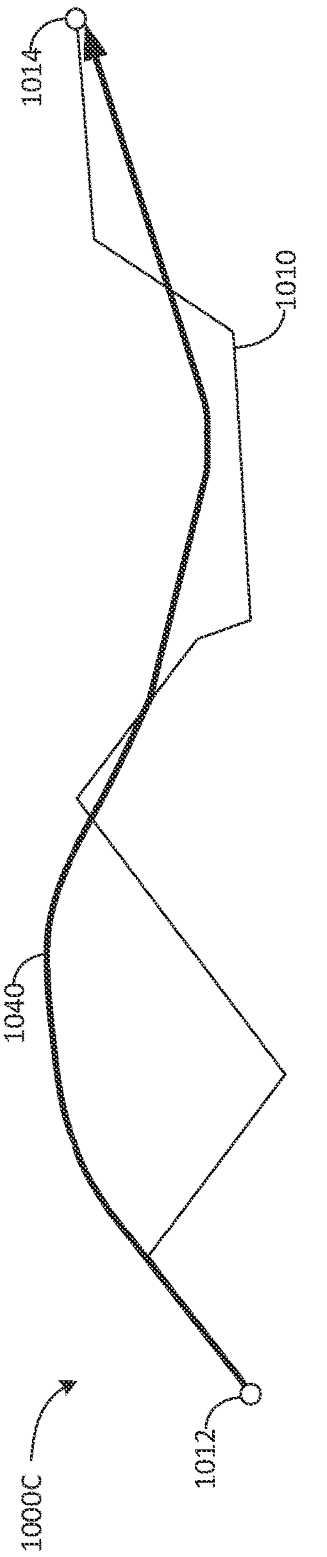

FIGS. 10A-10C are diagrams 1000A-1000C illustrating an example of continuous path optimization performed to obtain at least one fine-optimized path, in accordance with some implementations of the present disclosure. For example, the diagrams 1000A-1000C can represent respective iterations of an iLQR method performed by the continuous path optimization component 770 of FIG. 7. As will be described, the continuous path optimization can be performed in a rolling manner to enable a fixed time horizon regardless of length of the target path, thereby improving path stability. Each subsequent iteration can be performed to improve a cost function associated with the path.

In FIG. 10A, the diagram 1000A shows a discrete path 1010 having a start point 1012 and an end point or goal 1014. A first iteration of the iLQR method is performed to obtain a first intermediate path segment 1020 having the start point 1012 and an end point 1022 corresponding to a first intermediate path segment target in view of the cost function.

In FIG. 10B, the diagram 1000B shows a second iteration of the iLQR method that is performed to obtain a second intermediate path segment 1030 having a start point at some progression along the first intermediate path segment 1020, and an end point 1032 corresponding to a second intermediate path segment target in view of the cost function. The second intermediate path segment 1030 can be generated from a given distance along the first intermediate path segment 1020. For example, the given distance can be expressed as a percentage progression along the first intermediate path segment 1020.

In FIG. 10C, the diagram 1000C shows a final iteration of the iLQR method that is performed to obtain a fine-optimized path 1040 in view of the cost function. The fine-optimized path 1040 starts from the start point 1012 and ends at the end point or goal 1022. Any suitable number of additional iterations of the iLQR method (not shown) can be performed between the second iteration and the final iteration to achieve the fine-optimized path 1040.

Figure 11:
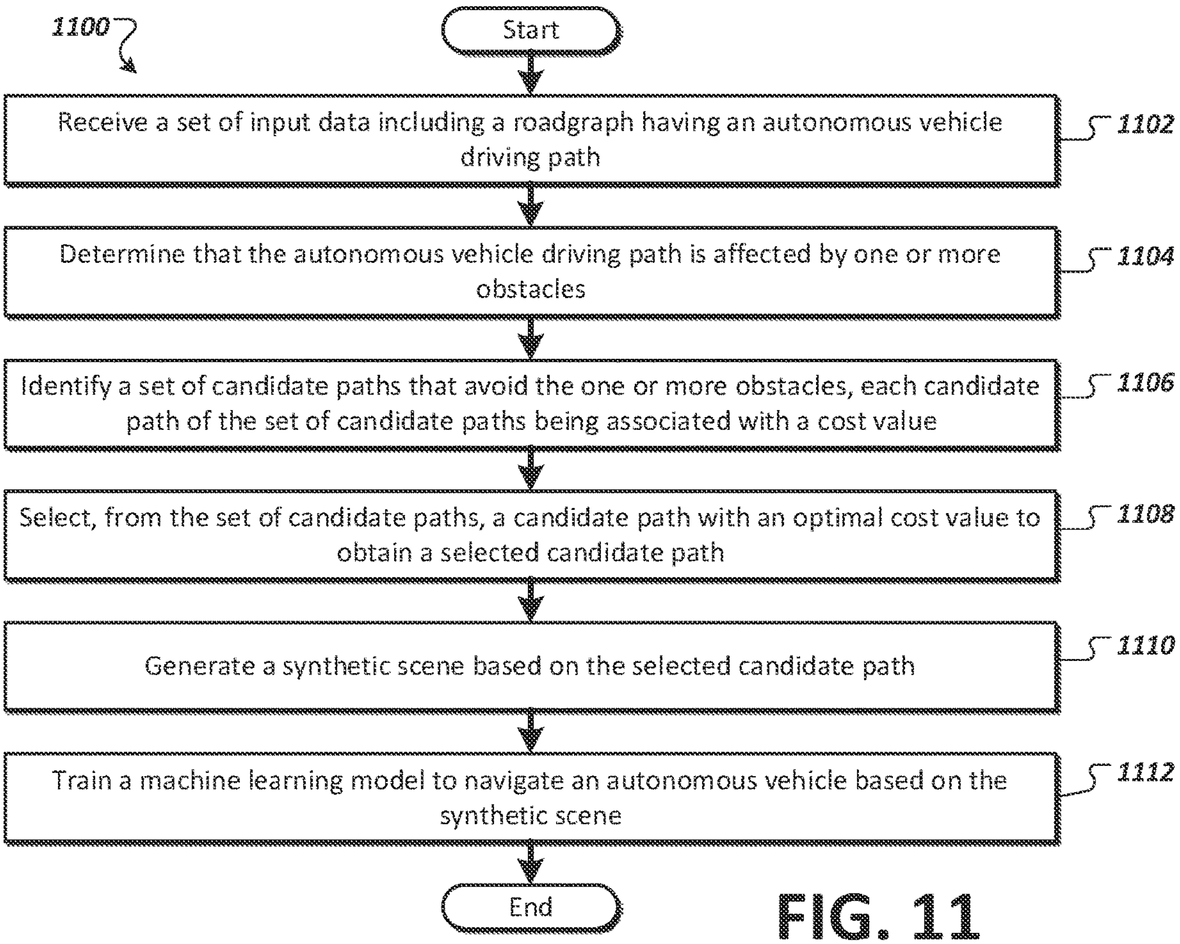
FIG. 11 is a flow diagram of an example method of training a machine learning model for an autonomous vehicle (AV) using synthetic scenes, in accordance with some implementations of the present disclosure.

FIG. 11 is a flow diagram of an example method 1100 of training a machine learning model for an autonomous vehicle (AV) using synthetic scenes, in accordance with some implementations of the present disclosure. The method 1100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the processing logic can be included within an offboard system. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 1102, the processing logic receive a set of input data including a roadgraph having an autonomous vehicle driving path. The roadgraph can correspond to a data structure representing a one-dimensional space having a set of properties to be queried. For example, the set of properties can include at least one of: path center location, path heading, distance to left/right boundaries, speed limit, and drivability. The set of input data can further include a message of real run segments without scenes.

At operation 1104, the processing logic determines that the autonomous vehicle driving path is affected by one or more obstacles. For example, an obstacle can be a zone (e.g. construction zone), an edge (e.g., a road edge), etc. In some implementations, determining that the autonomous vehicle driving path is affected by one or more obstacles comprises generating a scene configuration for the roadgraph using a probabilistic programming language (PPL), and identifying the one or more obstacles from the scene configuration.

At operation 1106, the processing logic identifies a set of candidate paths that avoid the one or more obstacles, with each candidate path of the set of candidate paths being associated with a cost value. For example, each candidate path of the set of candidate paths can have a respective set of inputs for a cost function that generates a respective cost value.

At operation 1108, the processing logic selects, from the set of candidate paths, a candidate path with an optimal cost value to obtain a selected candidate path (e.g., candidate path 650-1, 650-2, 650-3 or 650-4 of FIG. 6D). In some implementations, the candidate path is selected using discrete path optimization to obtain a coarse-optimized path. For example, obtaining the coarse-optimized path can include employing a dynamic programming method.

At operation 1110, the processing logic generates a synthetic scene based on the selected candidate path. In some implementations, the synthetic scene includes a synthetic construction zone. In some implementations, generating the synthetic scene includes modifying the selected candidate path using continuous path optimization to obtain a fine-optimized path (e.g., path 1040 of FIG. 10C), and generating the synthetic scene based on the fine-optimized path. For example, modifying the coarse optimized path can include employing iLQR or other suitable continuous path optimization method. Obtaining the synthetic scene can include modifying the autonomous vehicle driving path of the roadgraph to obtain a modified synthetic path of a modified roadgraph having ground-truth lane labels. The modified synthetic path can include a path shift and/or a path merge into a second synthetic path of the modified roadgraph.

At operation 1112, the processing logic trains a machine learning model to navigate an autonomous vehicle based on the synthetic scene. The machine learning model can produce an output that can be used by the autonomous vehicle to recognizes a scene, such as a construction zone, and thus enable the autonomous vehicle to modify its course along a path in accordance with the scene. For example, if the scene is a construction zone, the autonomous vehicle can modify its course to follow a detour (e.g., lane split and/or merge) by recognizing construction zone objects that demarcate the detour (e.g., cones). For example, training the machine learning model can include generating a set of training input data including a set of data frames from the synthetic scene, obtaining a set of target output data (e.g., ground truth annotations or labels) for the set of training input data, and training the machine learning model based on the set of training input data and the set of target output data data. The set of target output data can include at least one of messages with injected markers and/or perception objects, or tensorflow examples. Further details regarding operations 1102-1112 are described above with reference to FIGS. 1-10.

Figure 12:
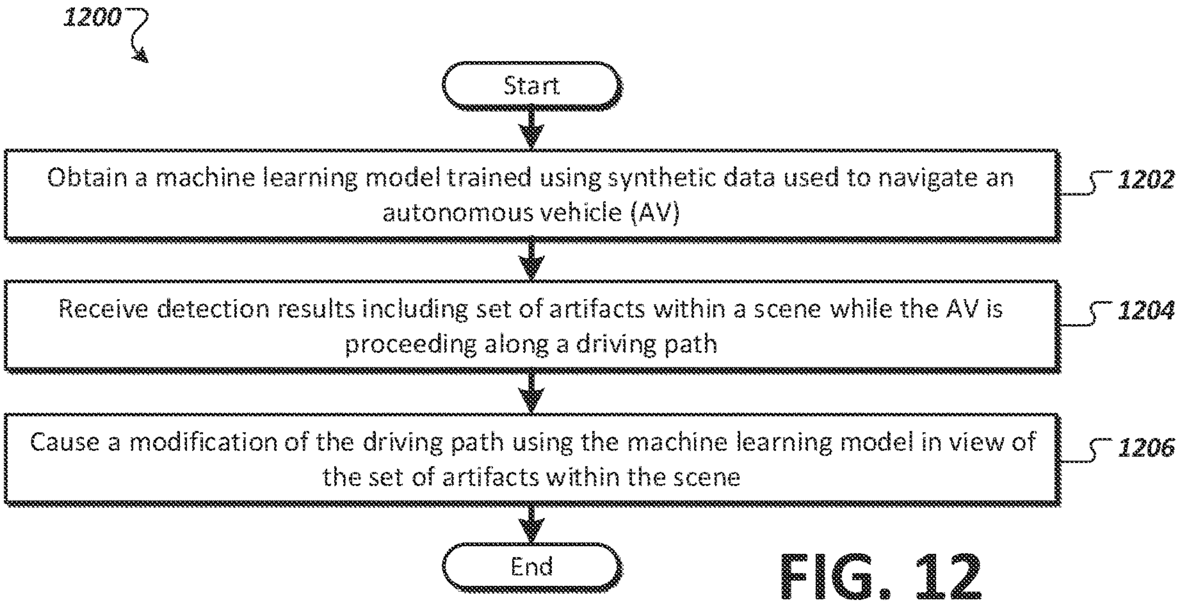
FIG. 12 is a flow diagram of an example method of using a trained machine learning model to enable control of an autonomous vehicle (AV), in accordance with some implementations of the present disclosure.

FIG. 12 is a flow diagram of an example method 1200 of using a trained machine learning model to enable control of an autonomous vehicle (AV), in accordance with some implementations of the present disclosure. The method 1200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the processing logic can be included within the control system of the AV (e.g., AVCS 140). Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 1202, the processing logic obtains a machine learning model trained using synthetic data used to navigate an autonomous vehicle (AV). The machine learning model can be the machine learning model trained in the manner described above with reference to FIGS. 1=11.

At operation 1204, the processing logic receives detection results including a set of artifacts within a scene while the AV is proceeding along a driving path. For example, the detection results can be received from upstream modules of the AV. In some implementations, the set of artifacts can designate lane closures and/or lane modifications that require the AV to take a detour. For example, if the scene is a construction zone scene, the set of artifacts can include construction zone artifacts (e.g. cones) that are used to direct vehicles around a construction zone.

At operation 1206, the processing logic causes a modification of the driving path in view of the set of artifacts within the scene. For example, the processing logic can determine a detour with respect to the driving path (e.g., a lane path and/or shift) in view of the objects identified within the scene, and can cause the AV to adjust its route in accordance with the detour.

Figure 13:
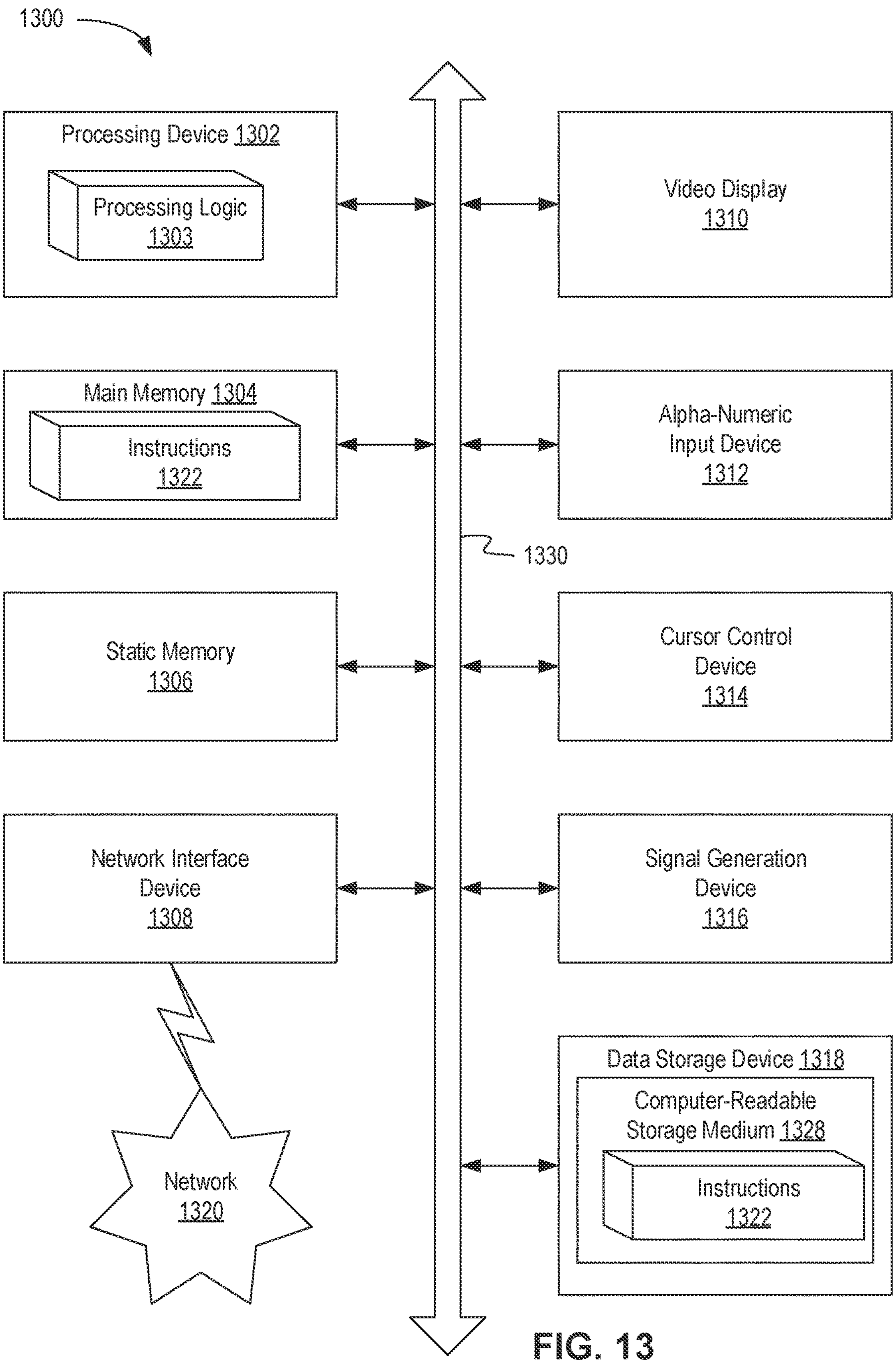
FIG. 13 depicts a block diagram of an example computer device within which a set of instructions, for causing the machine to perform any of the one or more methodologies discussed herein can be executed, in accordance with some implementations of the disclosure.

FIG. 13 depicts a block diagram of an example computer device 1300 within which a set of instructions, for causing the machine to perform any of the one or more methodologies discussed herein can be executed, in accordance with some implementations of the disclosure. Example computer device 1300 can be connected to other computer devices in a LAN, an intranet, an extranet, and/or the Internet. Computer device 1300 can operate in the capacity of a server in a client-server network environment. Computer device 1300 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" includes any collection of computers that individually or jointly execute a set (or multiple sets) of instructions to perform any one or more of the methods discussed herein. In some implementations, the computer device 1300 is AV server 150. In some implementations, the AV 101 includes computer device 1300 (e.g., AVCS 140 is computer device 1300).

Example computer device 1300 can include a processing device 1302 (also referred to as a processor or CPU), which can include processing logic 1303, a main memory 1304 (e.g., read-only memory (ROM), flash memory, dynamic random access memory (DRAM) such as synchronous DRAM (SDRAM), etc.), a static memory 1306 (e.g., flash memory, static random access memory (SRAM), etc.), and a secondary memory (e.g., a data storage device 1318), which can communicate with each other via a bus 1330.

Processing device 1302 represents one or more general-purpose processing devices such as a microprocessor, central processing unit, or the like. More particularly, processing device 1302 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 can also be one or more special-purpose processing devices such as an application specific integrated circuit (ASIC), a field programmable gate array (FPGA), a digital signal processor (DSP), network processor, or the like.

Example computer device 1300 can further comprise a network interface device 1308, which can be communicatively coupled to a network 1320. Example computer device 1300 can further comprise a video display 1310 (e.g., a liquid crystal display (LCD), a touch screen, or a cathode ray tube (CRT)), an alphanumeric input device 1312 (e.g., a keyboard), a cursor control device 1314 (e.g., a mouse), and an acoustic signal generation device 1316 (e.g., a speaker).

Data storage device 1318 can include a computer-readable storage medium (or, more specifically, a non-transitory computer-readable storage medium) 1328 on which is stored one or more sets of executable instructions 1322.

Executable instructions 1322 can also reside, completely or at least partially, within main memory 1304 and/or within processing device 1302 during execution thereof by example computer device 1300, main memory 1304 and processing device 1302 also constituting computer-readable storage media. Executable instructions 1322 can further be transmitted or received over a network via network interface device 1308.

While the computer-readable storage medium 1328 is shown in FIG. 13 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" includes any medium that is capable of storing or encoding a set of instructions for execution by the machine that cause the machine to perform any one or more of the methods described herein. The term "computer-readable storage medium" includes, but is not limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment," "one embodiment," "some embodiments," "an implementation," "one implementation," "some implementations," or the like throughout may or may not mean the same embodiment or implementation. One or more embodiments or implementations described herein may be combined in a particular embodiment or implementation. The terms "first," "second," "third," "fourth," etc. as used herein are meant as labels to distinguish among different elements and may not necessarily have an ordinal meaning according to their numerical designation.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:

a memory device; and a processing device, operatively coupled to the memory device, to:

receive a set of input data including a roadgraph, the roadgraph comprising an autonomous vehicle driving path and one or more synthetic objects;

determine that the autonomous vehicle driving path is affected by one or more obstacles;

identify a set of candidate paths that avoid the one or more obstacles, each candidate path of the set of candidate paths being associated with a cost value based on a curvature of a respective candidate path;

select, from the set of candidate paths, a coarse-optimized path associated with an optimal cost value;

modify the coarse-optimized path using continuous path optimization to obtain a fine-optimized path;

generate a synthetic scene based on the fine-optimized path that is obtained by modifying the coarse-optimized path using the continuous path optimization, wherein placement of synthetic scene features is aligned to geometry of the fine-optimized path;

train a machine learning model to navigate an autonomous vehicle using the synthetic scene generated based on the fine-optimized path obtained by modifying the coarse-optimized path; and cause an autonomous vehicle control system to modify the autonomous driving path in view of one or more outputs of the trained machine learning model.

2. The system of claim 1, wherein the synthetic scene is a synthetic construction zone.

3. The system of claim 1, wherein the set of input data further comprises a message of real run segments without scenes.

4. The system of claim 1, wherein the coarse-optimized path is a modified autonomous vehicle driving path including at least one of: a path shift, or a path merge into a second autonomous vehicle driving path of the roadgraph.

5. The system of claim 1, wherein, to select the coarse-optimized path, the processing device is to obtain the coarse-optimized path by employing a dynamic programming method.

6. The system of claim 1, wherein, to modify the coarse-optimized path, the processing device is to employ an iterative Linear Quadratic Regulator (iLQR).

7. The system of claim 1, wherein the processing device is further to:

generate a set of training input data comprising a set of data frames from the synthetic scene; and obtain a set of target output data for the set of training input data, wherein the machine learning model is trained using the set of training input data and the set of target output data.

8. The system of claim 7, wherein the set of target output data comprises at least one of: messages with injected markers or perception objects, or tensorflow examples.

9. The system of claim 1, wherein the cost value is determined using a cost function that constrains a magnitude of the curvature of the respective candidate path.

10. The system of claim 1, wherein the roadgraph corresponds to a data structure representing a one-dimensional space having a set of properties comprising at least one of a path center location, a path heading, a distance to a left boundary, a distance to a right boundary, a speed limit, or path drivability.

11. The system of claim 1, wherein the placement of the synthetic scene features is aligned to the geometry of the fine-optimized path based on positioning of the synthetic scene features along one or more curves generated from the fine-optimized path and offsets from one or more respective reference locations of the fine-optimized path.

12. The system of claim 11, wherein the one or more respective reference locations comprise a center of the fine-optimized path, a distance to a left boundary or a distance to a right boundary.

13. The system of claim 1, wherein the synthetic scene comprises ground-truth lane annotations, and wherein to train the machine learning model to navigate the autonomous vehicle based on the generated synthetic scene, the processing device is to train the machine learning model using a set of data frames of the synthetic scene as a set of training input data and the ground-truth lane annotations as a set of target output data.

14. A method comprising:

receiving, by a processing device, a first set of input data including a roadgraph, the roadgraph comprising an autonomous vehicle driving path and one or more synthetic objects;

determining, by the processing device, that the autonomous vehicle driving path is affected by one or more obstacles;

identifying, by the processing device, a set of candidate paths that avoid the one or more obstacles, each candidate path of the set of candidate paths being associated with a cost value based on a curvature of a respective candidate path;

selecting, by the processing device from the set of candidate paths, a coarse-optimized path associated with an optimal cost value;

modifying the coarse-optimized path using continuous path optimization to obtain a fine-optimized path;

generating, by the processing device, a synthetic scene based on the fine-optimized path that is obtained by modifying the coarse-optimized path using the continuous path optimization, wherein placement of synthetic scene features is aligned to geometry of the fine-optimized path;

training, by the processing device, a machine learning model to navigate an autonomous vehicle using the synthetic scene generated based on the fine-optimized path obtained by modifying the coarse-optimized path; and causing an autonomous vehicle control system to modify the autonomous driving path in view of one or more outputs of the trained machine learning model.

15. The method of claim 14, wherein the synthetic scene is a synthetic construction zone.

16. The method of claim 14, wherein the set input data further comprises a message of real run segments without scenes.

17. The method of claim 14, wherein the coarse-optimized path is a modified autonomous vehicle driving path including at least one of: a path shift, or a path merge into a second autonomous vehicle driving path of the roadgraph.

18. The method of claim 14, wherein selecting the candidate path comprises obtaining the coarse-optimized path by employing a dynamic programming method.

19. The method of claim 14, wherein modifying the coarse-optimized path comprises employing an iterative Linear Quadratic Regulator (iLQR).

20. The method of claim 14, further comprising:

generating, by the processing device, a set of training input data comprising a set of data frames from the synthetic scene;

obtaining, by the processing device, a set of target output data for the set of training input data, wherein the machine learning model is trained using the set of training input data and the set of target output data.

21. The method of claim 20, wherein the set of target output data comprises at least one of: messages with injected markers or perception objects, or tensorflow examples.

22. A non-transitory computer-readable storage medium having instructions stored thereon that, when executed by a processing device, cause the processing device to:

receive a set of input data including a roadgraph, the roadgraph comprising an autonomous vehicle driving path and one or more synthetic objects;

determine that the autonomous vehicle driving path is affected by one or more obstacles;

identify a set of candidate paths that avoid the one or more obstacles, each candidate path of the set of candidate paths being associated with a cost value based on a curvature of a respective candidate path;

select, from the set of candidate paths, a coarse-optimized path associated with an optimal cost value;

modify the coarse-optimized path using continuous path optimization to obtain a fine-optimized path;

generate a synthetic scene based on the fine-optimized path that is obtained by modifying the coarse-optimized path using the continuous path optimization, wherein placement of synthetic scene features is aligned to geometry of the fine-optimized path;

train a machine learning model to navigate an autonomous vehicle, using the synthetic scene generated based on the fine-optimized path obtained by modifying the coarse-optimized path; and cause an autonomous vehicle control system to modify the autonomous driving path in view of one or more outputs of the trained machine learning model.

* * * * *